(12) United States Patent
Seuss et al.

(10) Patent No.: US 10,275,640 B2
(45) Date of Patent: Apr. 30, 2019

(54) DETERMINING FACIAL PARAMETERS

(71) Applicant: Fraunhofer-Gesellschaft zur Foerderung der angewandten Forschung e.V., Munich (DE)

(72) Inventors: Dominik Seuss, Memmelsdorf (DE); Teena Chakkalayil Hassan, Erlangen (DE); Johannes Wollenberg, Erlangen (DE); Andreas Ernst, Weiden (DE); Jens-Uwe Garbas, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/486,597

(22) Filed: Apr. 13, 2017

(65) Prior Publication Data

US 2017/0300741 A1 Oct. 19, 2017

(30) Foreign Application Priority Data

Apr. 14, 2016 (EP) .................................... 16165420

(51) Int. Cl.
*G06K 9/00* (2006.01)
*G06K 9/62* (2006.01)

(52) U.S. Cl.
CPC ..... *G06K 9/00268* (2013.01); *G06K 9/00221* (2013.01); *G06K 9/00228* (2013.01); *G06K 9/00261* (2013.01); *G06K 9/00281* (2013.01); *G06K 9/00302* (2013.01); *G06K 9/00315* (2013.01); *G06K 9/00335* (2013.01); *G06K 9/6256* (2013.01); *G06K 9/6267* (2013.01)

(58) Field of Classification Search
CPC ............ G06T 2207/10016; G06T 7/73; G06K 9/0061; G06K 9/00315; G06K 9/00335; H04N 5/23222
See application file for complete search history.

(56) References Cited

U.S. PATENT DOCUMENTS 7,535,469 B2 * 5/2009 Kim .................... G06K 9/00234
345/419
7,742,623 B1 * 6/2010 Moon ................ G06K 9/00604
382/103

(Continued)

FOREIGN PATENT DOCUMENTS

EP 2031544 A1 * 3/2009 ......... G06K 9/00248

OTHER PUBLICATIONS

Agdogan, D. Mathematical Modeling of Human Facial Muscles. Submitted to Graduate School of Science and Engineering of Isik University. May 2015.*

(Continued)

*Primary Examiner* — Chan S Park
*Assistant Examiner* — Mai H Tran
(74) *Attorney, Agent, or Firm* — Perkins Coie LLP; Michael Glenn

(57) ABSTRACT

A device includes an input to sequential data associated to a face; a predictor configured to predict facial parameters; and a corrector configured to correct the predicted facial parameters on the basis of input data, the input data containing geometric measurements and other information. A related method and a related computer program are also disclosed.

19 Claims, 11 Drawing Sheets

(56) References Cited

U.S. PATENT DOCUMENTS

Figure 1:
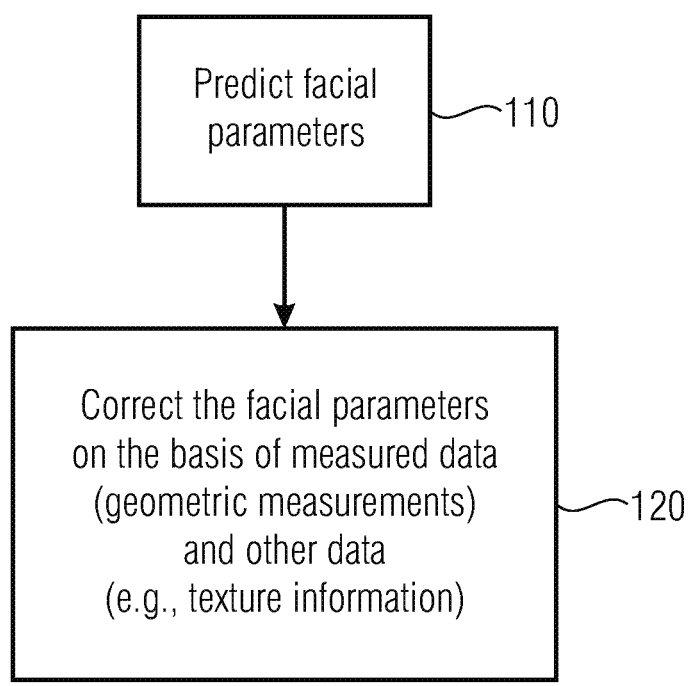

| | | | | |
|---|---|---|---|---|
| 7,848,548 B1* | 12/2010 | Moon | ............... | G06K 9/00281 382/100 |
| 8,331,616 B2* | 12/2012 | Sabe | ............... | G06K 9/00248 382/103 |
| 9,317,954 B2* | 4/2016 | Li | ............... | G06T 13/40 |
| 9,595,083 B1* | 3/2017 | Smith | ............... | G06T 19/20 |
| 9,747,494 B2* | 8/2017 | Lo | ............... | G06K 9/00288 |
| 9,875,398 B1* | 1/2018 | Young | ............... | G06K 9/00288 |
| 2006/0104487 A1* | 5/2006 | Porter | ............... | G06K 9/00228 382/118 |
| 2006/0146046 A1* | 7/2006 | Longhurst | ............... | G01S 3/7865 345/418 |
| 2007/0009135 A1* | 1/2007 | Ishiyama | ............... | G06T 7/20 382/103 |
| 2007/0122001 A1* | 5/2007 | Wang | ............... | G06K 9/00208 382/103 |
| 2007/0217683 A1* | 9/2007 | Kinoshita | ............... | G06K 9/00214 382/190 |
| 2008/0130961 A1* | 6/2008 | Kinoshita | ............... | G06K 9/00281 382/118 |
| 2008/0260212 A1* | 10/2008 | Moskal | ............... | A61B 5/1079 382/118 |
| 2009/0060290 A1* | 3/2009 | Sabe | ............... | G06K 9/00248 382/118 |
| 2009/0226029 A1* | 9/2009 | Shimano | ............... | G06T 5/009 382/100 |
| 2010/0111370 A1* | 5/2010 | Black | ............... | G06K 9/00369 382/111 |
| 2011/0007174 A1* | 1/2011 | Bacivarov | ............... | G06K 9/00281 348/222.1 |
| 2011/0075933 A1* | 3/2011 | Hong | ............... | G06K 9/00228 382/190 |
| 2011/0263946 A1* | 10/2011 | el Kaliouby | ............... | A61B 5/1128 600/300 |
| 2012/0050493 A1* | 3/2012 | Ernst | ............... | G02B 27/017 348/47 |
| 2012/0082370 A1* | 4/2012 | Yasukawa | ............... | G06T 7/33 382/154 |
| 2012/0158179 A1* | 6/2012 | Ooga | ............... | B25J 9/1633 700/259 |
| 2012/0249725 A1* | 10/2012 | Corcoran | ............... | G06T 3/0062 348/36 |
| 2012/0249726 A1* | 10/2012 | Corcoran | ............... | G06T 3/0062 348/36 |
| 2012/0259240 A1* | 10/2012 | Llewellynn | ............... | G06Q 30/02 600/558 |
| 2012/0327220 A1* | 12/2012 | Ma | ............... | H04N 5/232 348/135 |
| 2013/0142426 A1* | 6/2013 | Kaneda | ............... | G06K 9/4642 382/165 |
| 2014/0050408 A1* | 2/2014 | Balasubramanian | ............... | G06K 9/00281 382/195 |
| 2015/0009277 A1* | 1/2015 | Kuster | ............... | G06T 15/205 348/14.07 |
| 2015/0025681 A1* | 1/2015 | Riek | ............... | G05B 15/02 700/245 |
| 2016/0150260 A1* | 5/2016 | Ovide | ............... | H04N 21/2668 725/12 |
| 2016/0203357 A1* | 7/2016 | Morishita | ............... | G06K 9/00248 382/190 |
| 2016/0217318 A1* | 7/2016 | Hayasaka | ............... | G06T 3/60 |
| 2016/0217338 A1* | 7/2016 | Li | ............... | G06K 9/00765 |
| 2016/0300100 A1* | 10/2016 | Shen | ............... | G06K 9/00248 |
| 2017/0140212 A1* | 5/2017 | Lo | ............... | G06K 9/00288 |
| 2017/0278262 A1* | 9/2017 | Kawamoto | ............... | B64C 39/02 |
| 2017/0286759 A1* | 10/2017 | Yao | ............... | G06K 9/00308 |
| 2017/0300741 A1* | 10/2017 | Seuss | ............... | G06K 9/00228 |
| 2017/0319123 A1* | 11/2017 | Voss | ............... | G06F 19/00 |
| 2017/0330028 A1* | 11/2017 | Lo | ............... | G06K 9/00288 |

OTHER PUBLICATIONS

Almaev, Timur R. et al., "Local Gabor Binary Patterns from Three Orthogonal Planes for Automatic Facial Expression Recognition", 2013 Humaine Association Conference on Affective Computing and Intelligent Interaction, Sep. 2013, pp. 356-361.

Dalal, Navneet et al., "Histograms of Oriented Gradients for Human Detection", Proceedings of the 2005 IEEE Computer Society Conference on Computer Vision and Pattern Recognition (CVPR'05), vol. 1, Jun. 2005, pp. 886-893.

Ekman, P. t al., "Measuring Facial Movement", Environmental Psychology and Nonverbal Behaviour 1(1), Fall 1976, pp. 56-75.

Huang, Di et al., "Local Binary Patterns and Its Application to Facial Image Analysis: A Survey", IEEE Transactions on Systems, Man, and Cybernetics—Part C: Applications and Reviews, vol. 41, No. 6, Nov. 2011, pp. 765-781.

Kotsia, I. et al., "Fusion of geometrical and texture information for facial expression recognition", in Image Processing, 2006 IEEE International Conference on, Oct. 2006, pp. 2649-2652.

Kotsia, Irene et al., "Texture and shape information fusion for facial action unit recognition", Advances in Computer-Human Interaction, 2008 First International Conference on, Feb. 2008, pp. 77-82.

Kueblbeck, et al., "Face detection and tracking in video sequences using the modified census transformation", Image Vision Computing 24 (2006), Jun. 2006, pp. 564-572.

Ming, Zuheng et al., "Facial action units intensity estimation by the fusion of features with multi-kernel support vector machine", , in Automatic Face and Gesture Recognition (FG), 2015 11th IEEE International Conference and Workshops on, vol. 06, May 2015, pp. 1-6.

Senechal, Thibaud et al., "Facial Action Recognition Combining Heterogeneous Features via Multikernel Learning", IEEE Transactions on Systems, Man, and Cybernetics—Part B: Cybernetics, vol. 42, No. 4, Aug. 2012, pp. 993-1005.

Shen, Chunhua et al., "Classification-Based Likelihood Functions for Bayesian Tracking", IEEE International Conference on Video and Signal Based Surveillance, 2006. AVSS '06, Nov. 1, 2016, 6 pages.

The ALIZ-E Project Team, "ALIZ-E Adaptive Strategies for Sustainable Long-Term Social Interaction", EU FP7 project, Grant Agreement No. 248116; Seventh Framework Programme (FP7) Objective ICT Feb. 1, 2009: Cognitive Systems and Robotics; Critical Analysis of Methods and Challenges in Non-Verbal Behaviour Recognition, Generation, and Adaptation; Part A: Report, May 15, 2011, 178 pages.

* cited by examiner variance of a Bernoulli distributed random variable

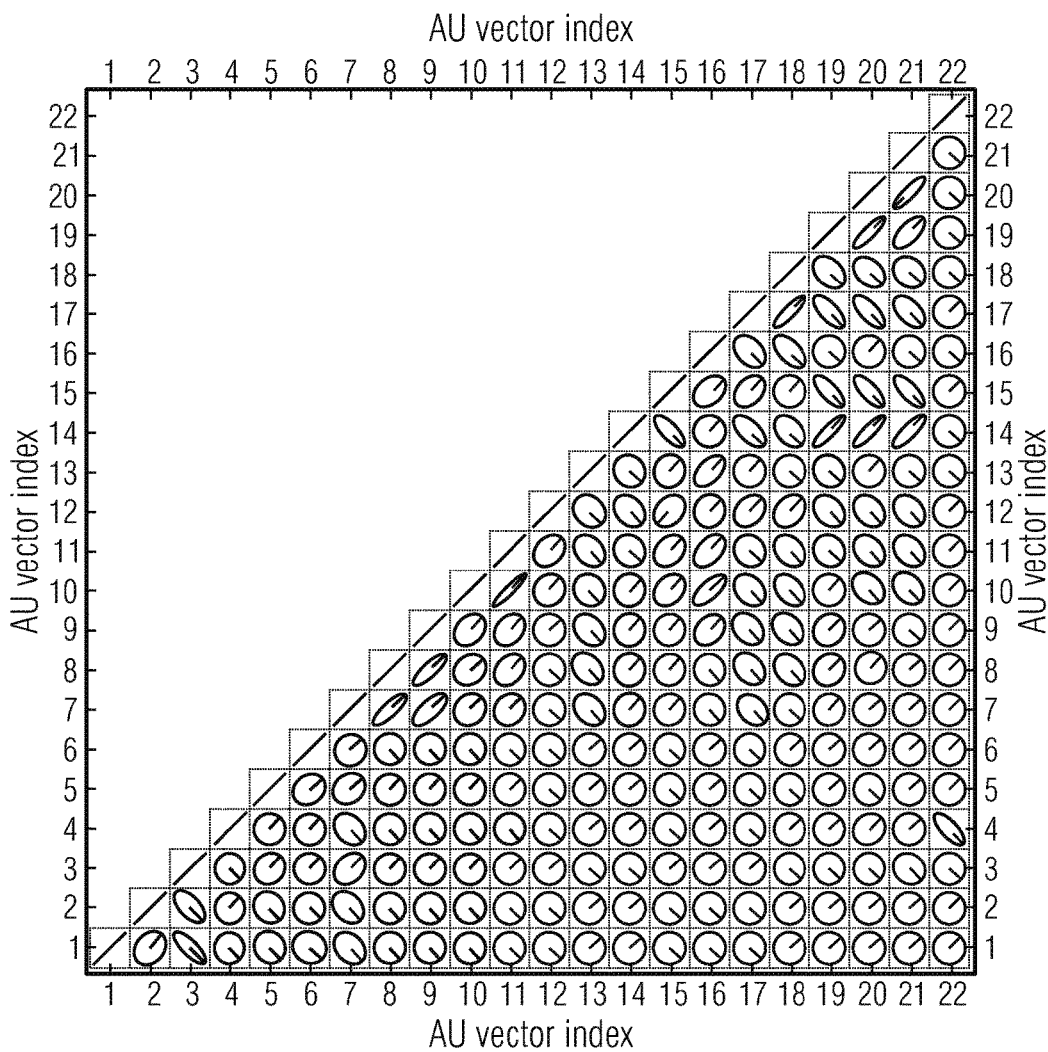

AU Vector Index Legend

1 : AU01_InnerBrowRaiser
2 : AU02_OuterBrowRaiser
3 : AU04_BrowLowerer
4 : AU05_UpperLidRaiser
5 : AU06_CheekRaiser
6 : AU07_LidTightener
7 : AU09_NoseWrinkler
8 : AU10_UpperLipRaiser
9 : AU11_NasolabialDeepener
10 : AU12_LipCornerPuller
11 : AU13_SharpLipPuller
12 : AU14_Dimpler
13 : AU15_LipCornerDepressor
14 : AU16_LowerLipDepressor
15 : AU17_ChinRaiser
16 : AU20_LipStretcher
17 : AU23_LipTightener
18 : AU24_LipPresser
19 : AU25_LipsPart
20 : AU26_JawDrop
21 : AU27_MouthStretch
22 : AU43_EyesClosed

Fig. 9

DETERMINING FACIAL PARAMETERS

CROSS-REFERENCE TO RELATED APPLICATIONS

This application claims priority from European Patent Application No. 16165420.7, which was filed on Apr. 14, 2016, and is incorporated herein in its entirety by reference.

1. BACKGROUND OF THE INVENTION

In many application domains of computer vision involving facial image analysis, such as pain detection, affective computing, etc., it is useful to determine action units.

The emergence of robust face detection algorithms in early 2000s accelerated research on automatic analysis of faces recorded in images and videos. Automatic analysis of facial expressions is one of the research fields that received increased attention since then. Research in this field is pursued mainly in two directions: one of the directions focuses on an objective analysis of basic facial movements based on the Facial Action Coding System (FACS) [1]. The other focuses on detecting a set of prototypical facial expressions of emotions.

Since more than ten years, systems such as the Sophisticated High-speed Object Recognition Engine SHORE™ have been developed. SHORE™ [2] is a general framework for various object detection tasks in images and videos, with a focus on face detection and analysis. SHORE™ detects and tracks faces in real-time, estimates age and gender, and identifies four basic expressions of emotions, namely happiness, sadness, anger and surprise.

Several attempts have been made in the field of AU detection and emotion recognition. Geometric features have been computed using the location of facial landmarks defined according to a deformable face model. Typical approaches for landmark localization include Active Appearance Models (AAM) and Constrained Local Model Fitting (CLM). Texture features encode visual texture information using, for example, histograms of oriented gradients (HOG), histograms of local binary patterns (LBP) or histograms of local Gabor binary patterns (LGBP).

According to an embodiment of conventional technology, a variant of artificial neural networks is used [3]. According to another embodiment, an SVM (support vector machine) fuses scores from classifiers [4]. Multiple kernel learning based fusion approaches use separate kernels for geometric and texture features. According to an embodiment of conventional technology [5], a multi-kernel SVM is used for feature fusion. A Gaussian kernel is used for geometric and gradient based texture features, and an intersection kernel is used for higher dimensional Gabor-based texture features. A multi-kernel SVM is also used in another teaching for feature fusion [6], where kernels of the same type are applied to geometric and texture features. For SVM, see also https://www.csie.ntu.edu.tw/~cjlin/libsvm/.

It is intended to perform a technique which permits to obtain more accurate information on facial expressions.

2. SUMMARY OF THE INVENTION

According to an embodiment, a device may have: an input which receives sequential data associated to a face; a predictor which predicts facial parameters; and a corrector which corrects the predicted facial parameters on the basis of the input data, the input data containing geometric measurements and other information.

According to another embodiment, a method may have the steps of: from a sequence of data representing a face, performing, for at least one of the images: predicting facial parameters; and correcting the predicted facial parameters on the basis of the input data, the input data containing geometric measurements and other information.

Another embodiment may have a non-transitory digital storage medium having a computer program stored thereon to perform the method may have the steps of: from a sequence of data representing a face, performing, for at least one of the images: predicting facial parameters; and correcting the predicted facial parameters on the basis of the input data, the input data containing geometric measurements and other information, when said computer program is run by a computer.

According to an aspect of the invention, there is provided a device comprising:
an input to receive sequential data associated to a face;
a predictor configured to predict facial parameters; and
a corrector configured to correct the predicted facial parameters on the basis of the input data,
the input data containing geometric measurements and other information.

The correction of predicted facial parameters is more accurate if also other information (such as other visual data, such as, for example, texture information, or other data, such as information relating to audio and/or speech, physiological signals, gesture data and/or posture data etc.) is taken in account: some of the changes in facial appearance are more easily recognized. This conclusion is particularly efficient for image sequences: the capability of discerning between different facial actions is increased when, besides using measurements of point on the face, further information is used.

The face can be a human face. It can be acquired with live motion sensors, that provide, for example, a sequence of representations (images, 3D-point clouds, and so on) of the face.

According to an aspect of the invention, the device is a device for obtaining facial parameters.

The invention permits, inter alia, to combine two sources of information (geometric measurements and other information, such as texture information). An idea underlying the invention is that facial expressions are normally accompanied by both deformation of shape of facial features and changes in the other information (such as changes in facial texture).

According to the invention, the data associated to a face can be chosen between 2D data (e.g., images) and 3D representations (e.g., 3D-point clouds), or combination of 3D data with 3D data.

The input data (sequential data) can refer to the temporal evolution of the face, for example.

According to an aspect of the invention, the device is configured, for at least one of the data associated to a face (and for at least a subset of the sequence), for predicting facial parameters on the basis of predicted data and/or corrected data in correspondence of previous images.

The correction of the predicted data is more precise if also data relating to other information (such as texture information) is used. It is possible to estimate, for example, on the basis of information determined by colors and/or intensities of colors and/or grey scales, or their average values, weighed average values, variance, probabilities, etc., of parts of the images, if they refer (or if they have a high probability of referring) to particular facial appearances (e.g., "wrinkles").

The other information can also comprise data obtained by speech (e.g., voice analysis, decoded audio frames, and so on), gesture data, posture data, physiological data, voice, and so on, or combinations thereof. The other information can be acquired by sensors. The other information can be split in several data, each associated to a particular instant of the temporal evolution of the face (and to the geometrical measurements). For example, at instant $t_k$, it is possible to have geometrical measurements associated thereto, and other information (e.g., texture information) also associated thereto.

It is also possible to have more than two inputs. For example, it is possible to have, beside an input comprising geometrical measurements (e.g., distances between landmarks) and texture information, also data referring to speech, gesture, posture, and/or physiological state of a human.

According to an aspect of the invention the device is configured for obtaining (in input and/or by acquiring with appropriate camera means) measurements on positions of facial points to obtain at least some of the geometric measurements. In order to obtain the measurements, it is possible to rely on landmarks and/or facial points which are in the images. It is possible to acquire images using cameras (e.g., based on CCDs or the like) so as to obtain images in a computable form (e.g., bitmaps, or other formats such as jpeg, gif, and so on).

According to an aspect of the invention, the device can be configured for classifying images or part of the images to obtain other information (such as texture information), e.g., upstream of the correcting step).

Classification can be based, for example, on analysing particular sections in one or more images (e.g., a group of pixels, such as a subset of adjacent pixels or mostly adjacent pixels) and classifying them on the basis of their appearance (e.g., colors and/or their intensities or grey scales, average values, weighed average values, variance, and so on). For example, it is possible to estimate a particular facial appearance (e.g., "wrinkles"), and/or providing a probability value indicating the probability that particular sections of the images depict a particular facial expression. Trained classifiers can be used.

According to an aspect of the invention, the device can be configured for classifying facial expressions according to action unit, AU, classes (e.g., downstream of the correcting step or as a part of the correcting step).

The correcting step, which can also correct facial parameters which can relate to AUs, can contribute to obtain a sound probability of the AU class. AU classes for example can be based on FACS AUs (e.g., AU06-"Cheek Raiser").

According to an aspect of the invention, the device can be configured for calculating the probability of at least an AU class (e.g., downstream of the correcting step or as a part of the correcting step).

According to an aspect of the invention, the device can be configured for estimating the intensity of at least one AU class.

In particular, it has been noted that a high probability of occurrence of an AU class (as calculated as described in the present disclosure) can be correlated to a high intensity of the AU. Hence, it is possible to infer the intensity of an AU on the basis of its probability.

According to an aspect of the invention, the device can be configured for determining at least one AU class at least on the basis of the probability and/or the intensity. For example, it is possible to compare the probability and/or the intensity of the AU with a predetermined threshold so as to determine the presence or absence of the AU in the sequence of images (or other face representations).

Accordingly, the present invention can be used to estimate whether a particular action is expressed by the face of a person. Several uses (in Psychiatric Research, Forensics, etc.) can therefore be implemented with the present invention.

The invention can implement a Kalman block (e.g., to embody the predictor and the corrector), which can be a Kalman filter (Kalman estimator). In particular, a Kalman filter without control commands can be implemented.

The invention can also be implemented by a particle filter block or other recursive Bayesian estimators.

According to an aspect of the invention, the device can be configured for modifying facial parameters obtained in correspondence of previous images on the basis of a function (or a Jacobian version thereof, such as a function expressed as a Jacobian matrix) that is based on the dynamics of face model parameters.

The function can be based on a mathematical model based, for example, on the dynamics of face model parameters. The mathematical model can keep in account how the facial parameters change from a time $t_k$ (e.g., associated to a previously analysed image image) to a time $t_{k+1}$ (e.g., associated to a currently analysed image). In some embodiments, the function permits to obtain a matrix ("F" or "$F^{(k)}$") that is to be multiplied to a state vector ("$x^{(k)}$") for obtaining the predicted facial parameters. This function can be used to obtain a Jacobian matrix which contains the first derivatives of the function.

Accordingly, it is possible to have a first estimation of the new state. Further calculations can be used to refine the values obtained with the first estimation.

According to an aspect of the invention, it is possible to calculate covariances of errors of predicted facial parameters. In some embodiments, these covariances are defined in a matrix ("P" or "$P^{(k)}$") which can be, for example, output by the predictor to the corrector. According to an aspect of the invention, covariances of errors of predicted facial parameters are used (e.g., in the corrector) for correcting the facial parameters. The corrector can also correct the covariances of errors.

According to an aspect of the invention, the device can be configured for using covariances associated to disturbance or the cumulative effect thereof (e.g., during the interval from two consecutive images) which can be used, for example, to calculate covariances of errors of predicted facial parameters. In some embodiments, these covariances can be defined in a matrix ("Q" or "$Q^{(k)}$") which is, for example, modified by the predictor.

In some embodiments, the matrix with covariances of errors in the predicted facial parameters at a step k+1 (i.e., associated to a $(k+1)^{th}$ image of a sequence of images) can be obtained (e.g., in the predictor) on the basis of matrixes obtained in correspondence of previous image, such as, for example:

a matrix describing the dynamics of face model parameters ($F^{(k)}$) and its transpose at step k (i.e., associated to the $k^{th}$ image of the sequence of images);

a matrix with covariances of errors in the predicted facial parameters as corrected at step k;

a matrix with covariances associated to disturbance or the cumulative effect thereof ($Q^{(k)}$) as obtained at step k.

According to an aspect of the invention, the device can be configured for using covariances of errors in acquiring measurements, e.g., to be used to update the covariances of errors of predicted facial parameters (e.g., $P^{(k)}$), e.g., in the corrector. These covariance can be part of a matrix ("R" or "$R^{(k)}$") which is, for example, changed in the predictor.

Advantageously, by keeping in account the covariances of errors in acquiring measurements ("$R^{(k)}$") a better correction can be performed.

According to an aspect of the invention, other information (such as texture information) is only used to perform the correction and is not used to perform the prediction. The corrector can manage more or less facial measurements than the states. Matrix R can have more or less dimensions than matrix Q. The corrector can manage more or less measurements than states.

According to an aspect of the invention, a means for acquiring images (e.g., a camera, a CCD, or the like) can be part of the structure (in some embodiments, the data are input from external sources, such as storage means).

According to an aspect of the invention, the other information can be embodied by SVMs.

According to an aspect of the invention, it is possible to implement a technique based on SVMs or other machine learning techniques.

The invention can also be implemented by a method (which can use all the structures discussed above and below) comprising:
from a sequence of data representing at least one face (e.g., images and/or 3D-point clouds), performing, for at least one of the images:
predicting facial parameters; and
correcting the predicted facial parameters on the basis of input data, the input data containing geometric measurements and other data, such as, for example, texture measurements (or other visual or non-visual data, such as gesture data, posture data, physiological data, audio data, and so on).

The method can also comprise steps of classifying (e.g., using SVMs), and/or steps of acquiring or inputting sequences of images.

According to the invention, there is provided a Kalman estimating method for facial parameters, the method comprising:
predicting states according to a dynamics describing function; and
correcting the predicted states on the basis of input data, wherein the states comprise a combination at least one of velocity and displacement with at least one with natural frequency of oscillation, a damping coefficient, a damping ratio, and acceleration and/or driving force.

This Kalman filter (e.g., applied to facial parameters) can be used to implement the claimed methods and/or devices discussed above and below.

According to the invention, it is also possible to implement a a particle filter block or other recursive Bayesian estimators.

The invention also relates to a computer program for performing any of the methods discussed here.

The invention also relates to the use of a constant velocity model for head pose parameters, constant position model for SU parameters, and mass spring damper model for AU parameters The invention can be based on using facial parameters based on a model describing properties of facial shape and deformation characteristics.

Contrary to several teachings of conventional technology, the present invention is based on a model-driven approach, which has the advantage that less data and less training time are are involved and higher accuracy and reliability for he given domain can be achieved. Given a good model, it is possible to capture relevant aspects of the application domain. For example, the inventive anatomically inspired model for facial deformations captures the underlying properties of facial motion.

Contrary to the known static approaches, the present invention does not exclude temporal aspects of facial motion. These temporal aspects help automated approaches to disambiguate facial expressions.

3. BRIEF DESCRIPTION OF THE DRAWINGS

Figure 2:
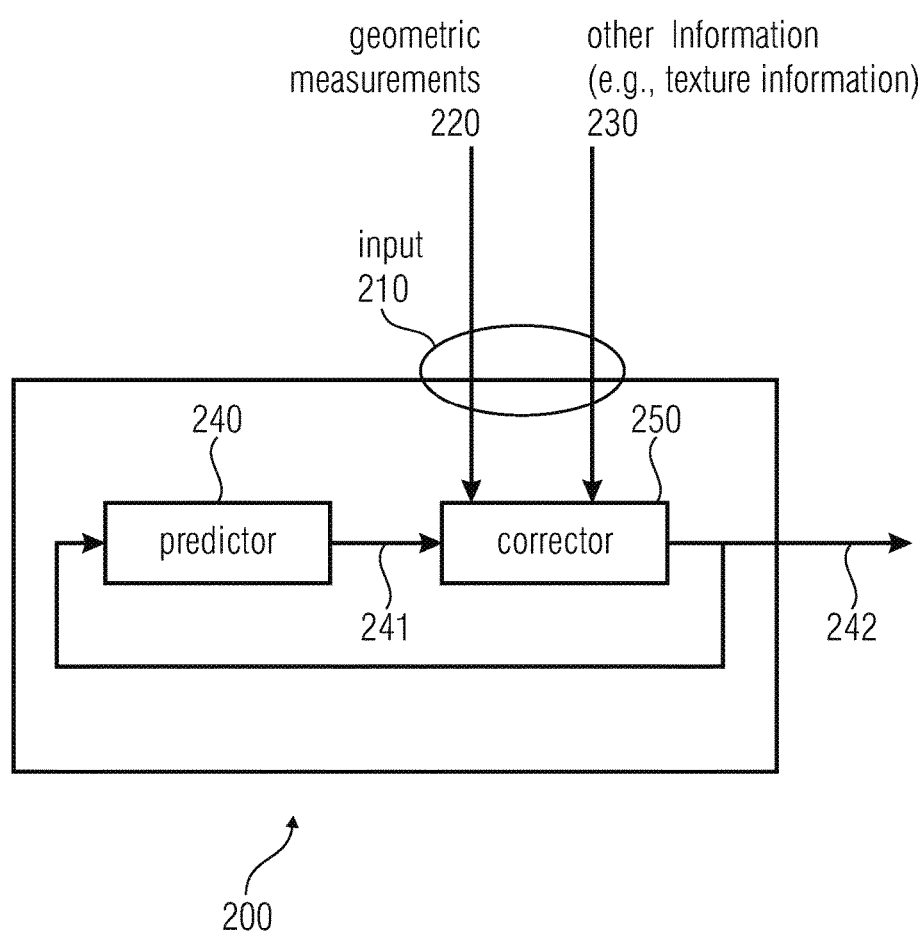
Figure 3:
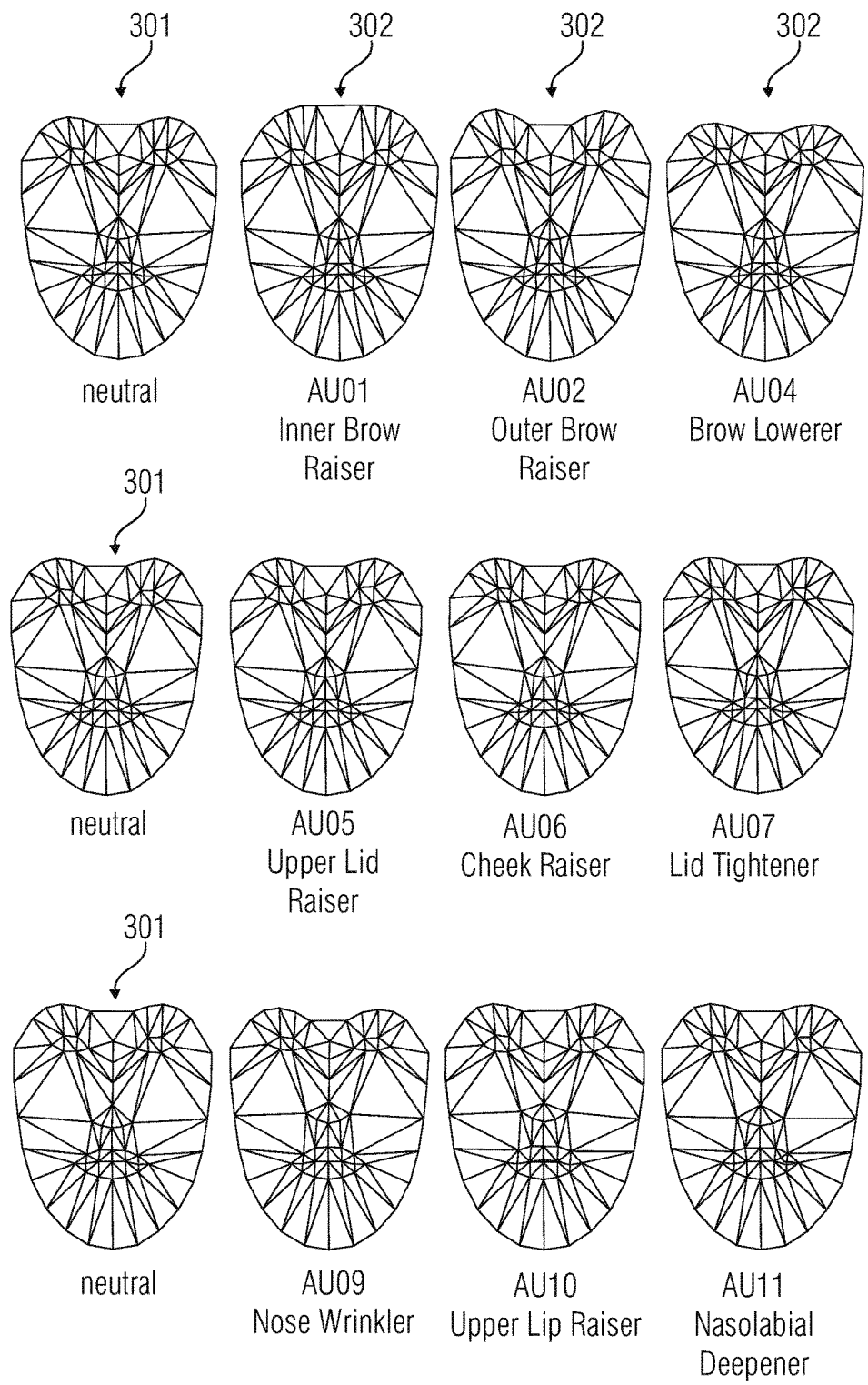
Figure 4:
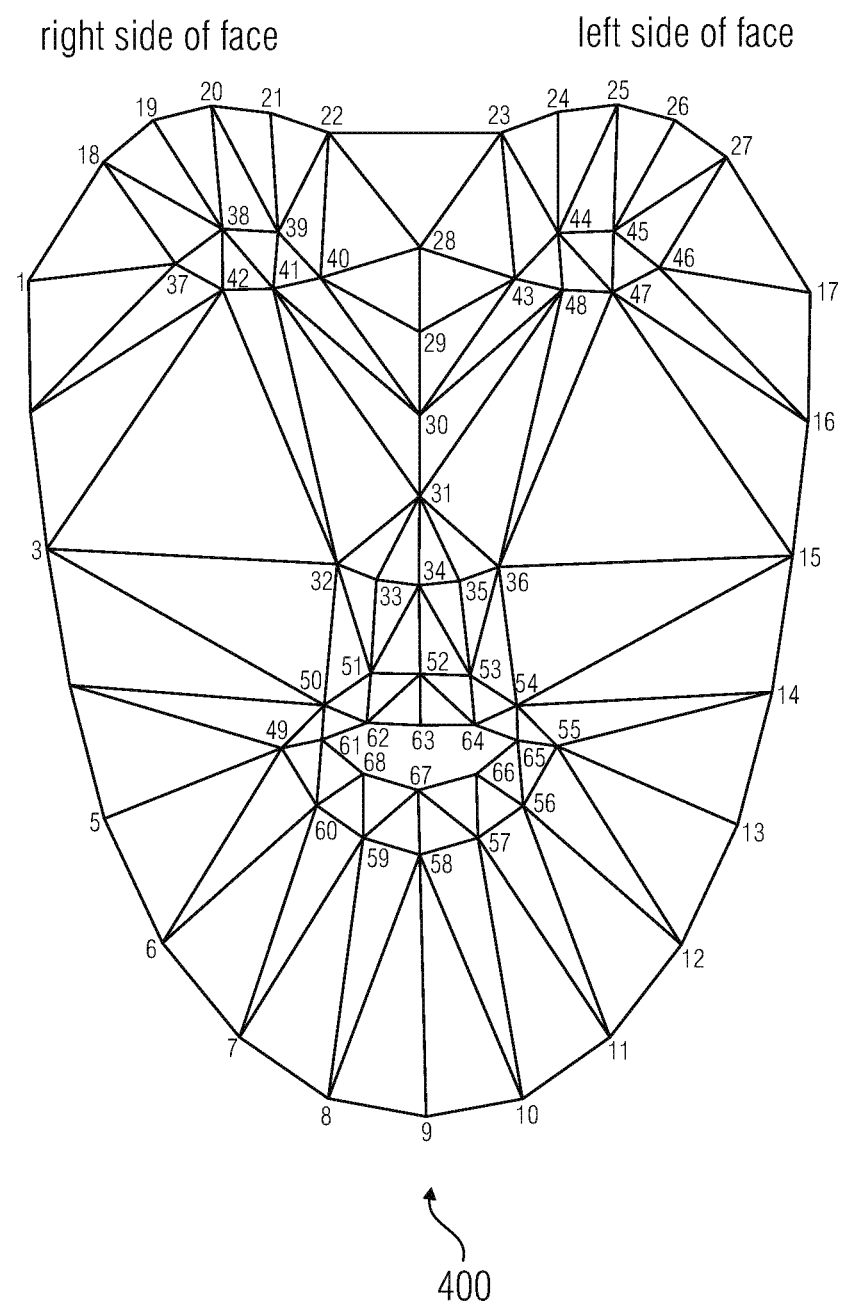
Figure 5:
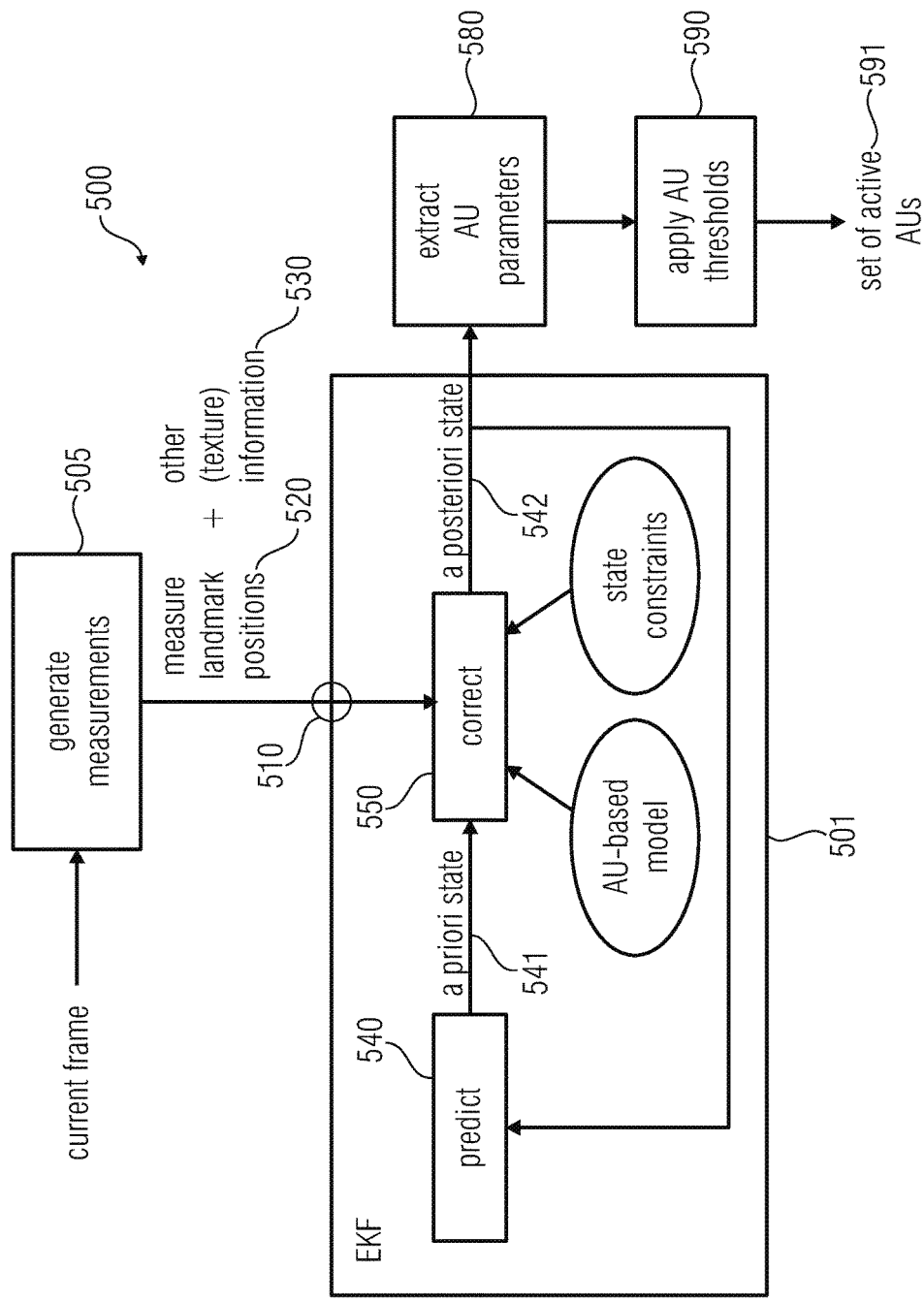
Figure 6:
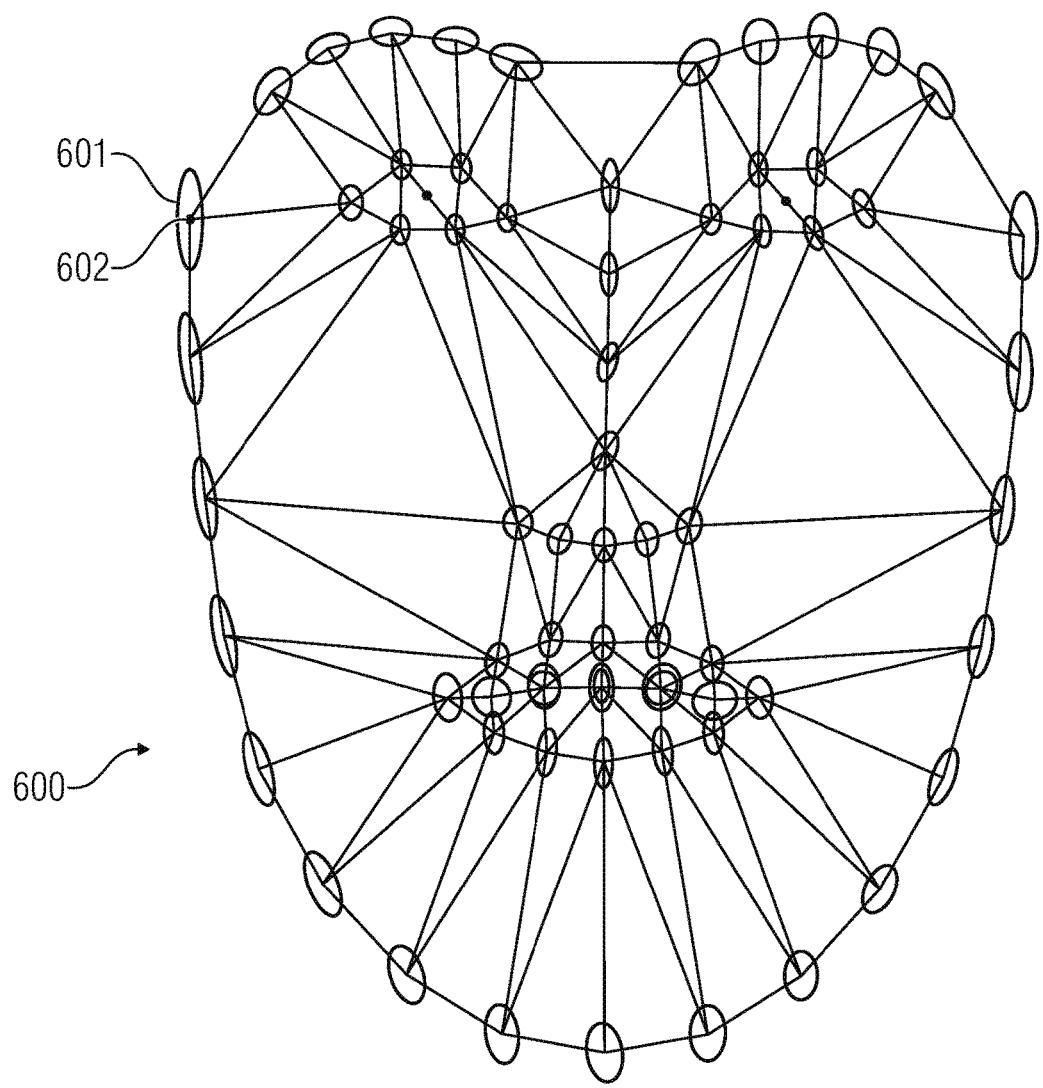
Figure 7:
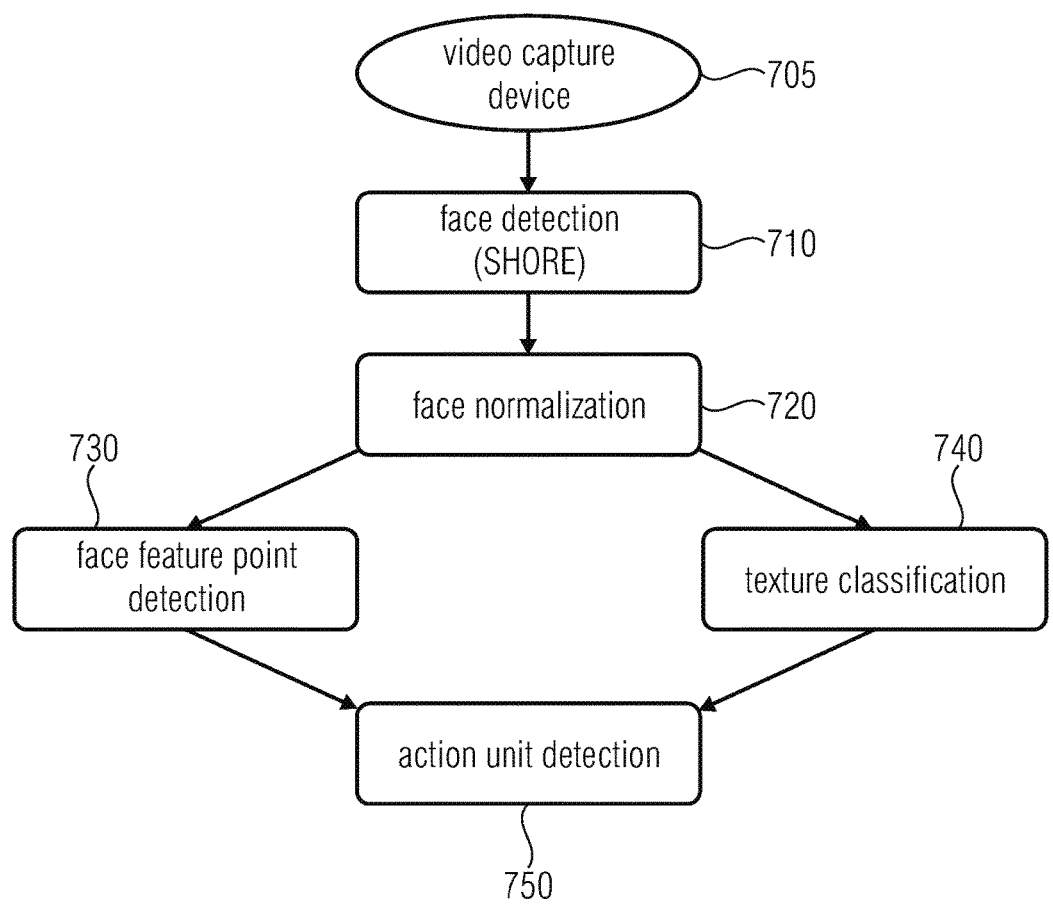
Figure 8:
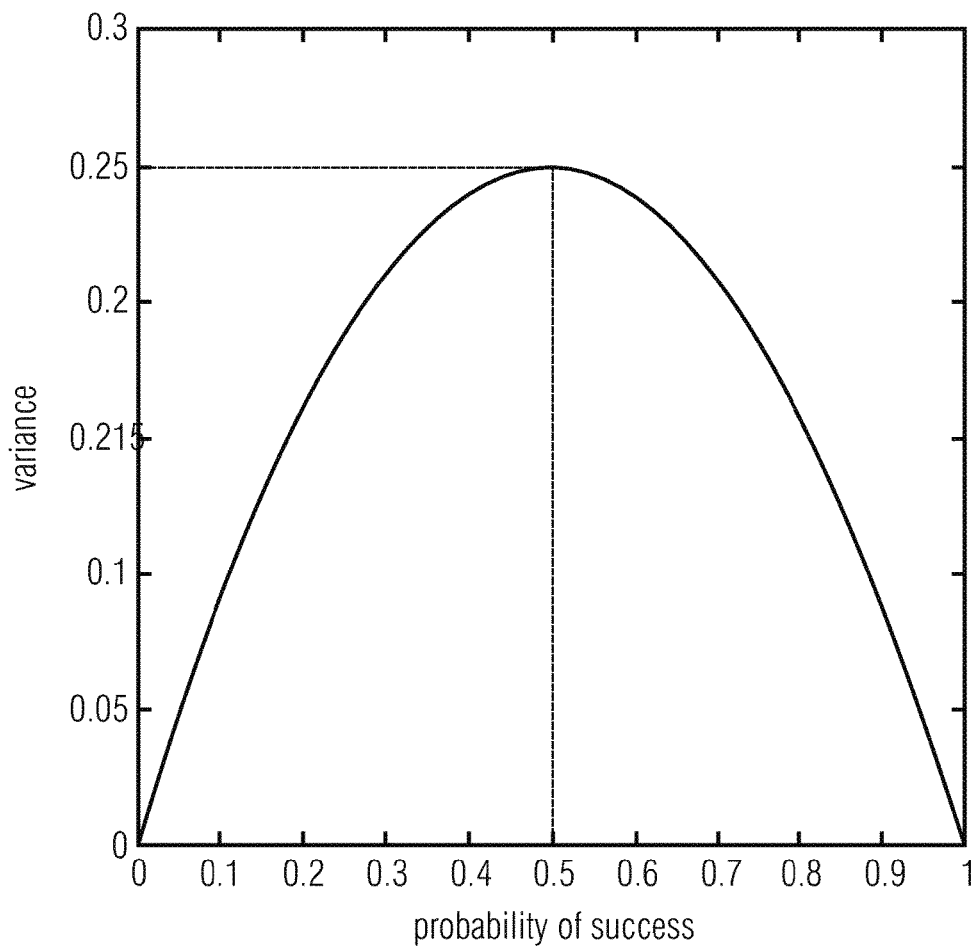
Figure 10:
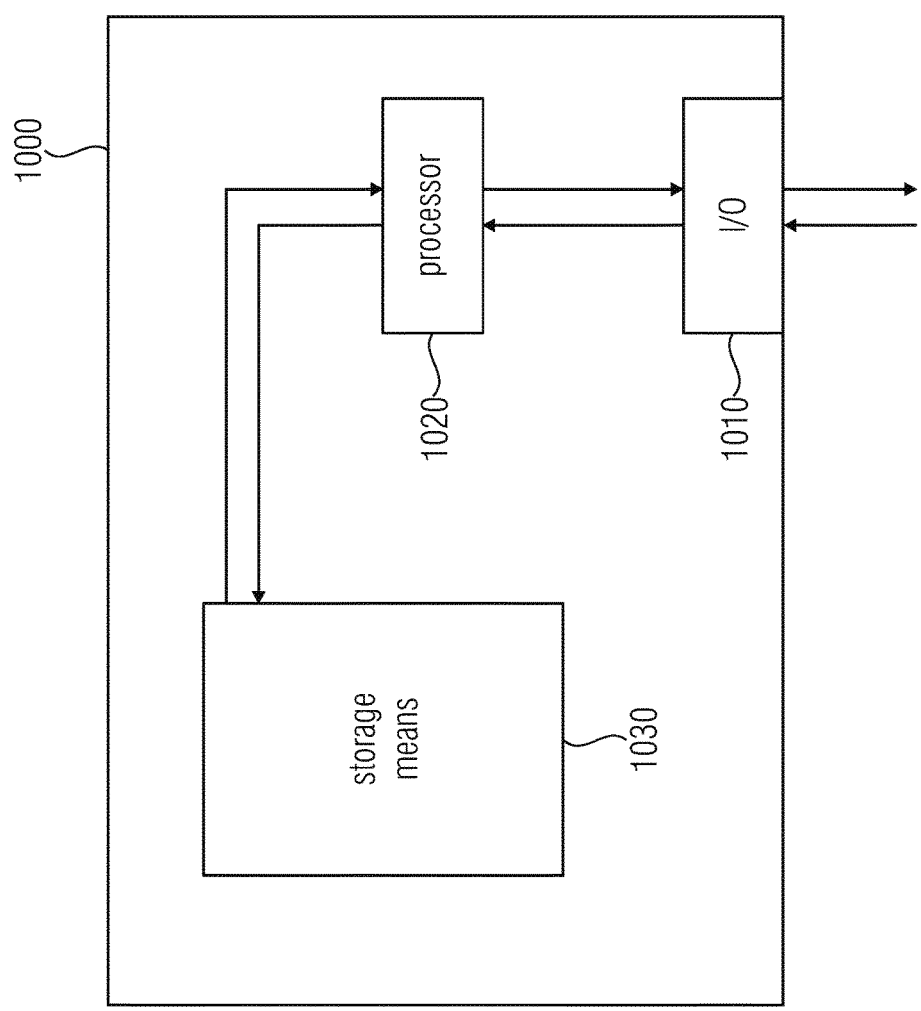
Figure 11:
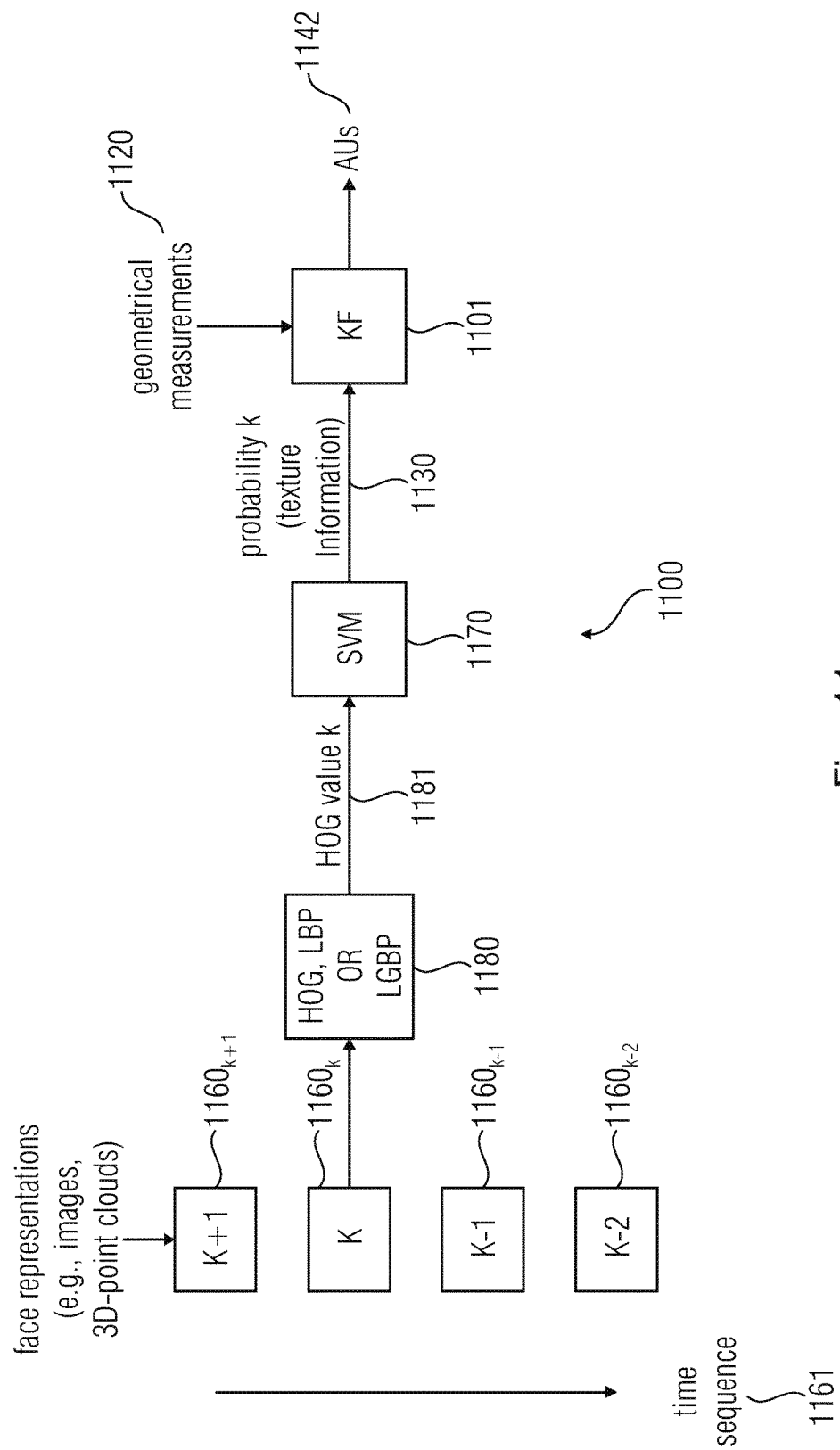

Embodiments of the present invention will be detailed subsequently referring to the appended drawings, in which:
FIG. 1 shows a method according to the invention;
FIG. 2 shows a device according to the invention;
FIG. 3 shows examples of action units;
FIG. 4 shows a representation of a human face with labelled facial points or facial landmarks;
FIG. 5 shows a scheme of the invention;
FIG. 6 shows measurement of noise;
FIG. 7 shows a scheme according to the invention;
FIG. 8 shows a diagram used for the present invention;
FIG. 9 is a diagram used in a method according to the invention;
FIG. 10 shows a computer system for implementing the invention;
FIG. 11 shows a scheme according to the invention.

4. DETAILED DESCRIPTION OF THE INVENTION 4.1 Facial Action Units

Standards have been defined to describe facial expressions. According to Facial Action Coding System (FACS), sequences of images are divided into action units (AUs). An example is provided in the following table.

| Code | Name |
| --- | --- |
| 01 | Inner Brow Raiser |
| 02 | Outer Brow Raiser |
| 04 | Brow Lowerer |
| 05 | Upper Lid Raiser |
| 06 | Cheek Raiser |
| 07 | Lid Tightener |
| 09 | Nose Wrinkler |
| 10 | Upper Lip Raiser |
| 11 | Nasolabial Deepener |
| 12 | Lip Corner Puller |
| 13 | Sharp Lip Puller |
| 14 | Dimpler |
| 15 | Lip Corner Depressor |
| 16 | Lower Lip Depressor |
| 17 | Chin Raiser |
| 20 | Lip Stretcher |
| 23 | Lip Tightener |
| 24 | Lip Presser |
| 25 | Lips Part |
| 26 | Jaw Drop |
| 27 | Mouth Stretch |
| 43 | Eyes Closed |

FIG. 3 shows projected wireframe models of AUs 01, 02, 04, 05, 06, 07, 09, 10 and 11 (indicated with 302), at their maximum intensities. The neutral face 301 is also included for clarity.

4.2 Models of Human Face

An AU model is a parameterised deformable shape model. It can be in the shape of vectors representing the deviation of landmarks of human face from the mean face, e.g., when the face is at the (anatomically-possible) maximum intensity.

These vectors can be obtained by transforming a set of high poly meshes into low poly meshes. For example, the software called FaceGen Modeller from Singular Inversions Inc. can be used. The low poly meshes can consist of a number of nodes (e.g., 68 nodes), which corresponded to 68 facial landmarks chosen to represent the shape of human face.

FIG. 4 shows a representation 400 of a human face with labelled facial points or facial landmarks (referred to as 1 . . . 68) that can be used to represent the shape of a human face. Points 1 to 17 represent the facial boundary, points 18 to 27 the eyebrows, points 28 to 36 the nose, points 37 to 48 the eyes, and 49 to 68 the mouth.

The following equation 1 describes the AU Model. x is the vector of positions of the (in this case 68) landmarks, and $\bar{x}$ is the mean face. A represents the matrix of 22 vectors, and a is a vector of the 22 parameters. According to the semantics of the AU vectors, the range of values acceptable for each of the parameters can be limited to [0,1]. $\alpha$, R and t are scale factor, 3D rotation matrix and 3D translation vector, respectively:

$$x = \bar{x} + A*a$$

$$x'_i = \alpha \cdot R * x_i + t; \; \forall i \in \{1, 2, \ldots, 68\} \quad (1)$$

It is also possible to extend the AU, for example, by including a number (e.g., 61) of vectors that represent the possible directions of person-dependent facial shape variations. These vectors can be extracted from the facial shape morphs. The shape variations represented by these vectors can be identified using the wording "Shape Units" (SU). The resulting Model can consist of 83 nonrigid parameters. No specific range limits are imposed. Equation 2 describes the AUSU Model in the reference frame {M}. S is the matrix of the 61 SU vectors and s is the vector of the 61 SU parameters:

$$x = \bar{x} + A*a + S*s$$

$$x'_i = s \cdot R * x_i + t; \; \forall i \in \{1, 2, \ldots, 68\} \quad (2)$$

AU parameters can be used to represent intensity of expression of a corresponding facial AU. The estimates for these parameters, produced by the model fitting process, for each frame in an image sequence, can be used directly as a continuous output indicating the intensity of expression, or can be used to make binary decisions about the activation of the corresponding AU, by applying suitable thresholds.

Notably, other models for AUs can be used according to the invention.

4.3 the Method of FIG. 1

FIG. 1 shows a method according to the invention. From a sequence of images (or other data, in particular visual data) representing a face, performing, for at least one (and in particular most) of the images:
- at 110, predicting facial parameters; and
- at 120, correcting the predicted facial parameters on the basis of input data, the input data containing geometric measurements and other data (such as, for example, texture information).

Accordingly, it is also possible to arrive at an estimate of the AUs (and/or their intensities) using a sequence of images.

The method shown in FIG. 1 can be iterated until the last image (or the last representation of the face) is reached. The method can be based on a Kalman filter and can be embodied by implementations discussed below.

4.4 the Device of FIG. 2

FIG. 2 shows a device 200 according to the invention. According to this embodiment, the device 200 comprises an input 210 to data 220 and 230. Data 220 and 230 are associated to a sequence of data representing a face. In the present example, reference is made to images.

However, other data representing a face can be used (e.g., 3D-point clouds or other). for other information, other data (such as non-visual data) can be used.

The images are in sequence 0, 1, . . . , k, k+1, . . . , in the sense that they have been acquired in consecutive time instants $t_0, t_1, \ldots, t_k, t_{k+1}, \ldots$ . At a general step k (relating to the image acquired at instant $t_k$), the following data are input:
- data 220 relating to geometrical measurements (such as distances calculated from the image); and
- data 230 relating to other data, such as texture information (such as data relating to associated to colors and/or their intensities or intensities of grey scales, average values, weighed average values, variance, and/or dates based on classifications such as "wrinkles" and so on);
- data 230 can also refer other visual or non-visual data, such as, for example, such as information relating to audio and/or speech, physiological signals, gesture data and/or posture data etc. (a combination of these inputs is also possible).

The device 200 can comprise a predictor 240 configured to output predicted facial parameters 241.

The device 200 can comprise a corrector 250 configured to correct the predicted facial parameters 241 on the basis of input data 220 and 230 related to step k (i.e., associated to the image acquired at instant $t_k$).

The device 200 can output corrected facial parameters 242, which can be provided to external devices and can be fed back to the predictor 240 to calculate new predicted facial parameters at step k+1.

According to an aspect of the invention, the predictor 240, at a given step k+1, does not manage data related to the image acquired at instant $t_{k+1}$, but only the feedback from the corrector 250. These data only refer to the image acquired at instant $t_{k+1}$, and to other calculations performed without taking in account the state and/or the measurements of step k. At an instant k+1, the predictor 240 simply estimates the state at k+1 trying to reproduce the dynamics of the physics of facial motion.

According to an aspect of the invention, the corrector 250, at step k+1, updates the predicted facial parameters 241 estimated by the predictor 240 by adding information obtained by actual measurements (i.e., data 220 and 230) on images acquired at time $t_{k+1}$.

4.5 The Scheme of FIG. 5

FIG. 5 shows a scheme 500 that can embody the invention (which can embody the device 200). There is represented a Kalman filter (estimator) 501 comprising:
- an input 510 to data associated to a sequence of images representing a face (or other data associated to a face, such as 3D-point clouds);
- a predictor 540 configured to predict facial parameters 541; and
- a corrector 550 configured to correct the predicted facial parameters 541 on the basis of input data 520, 530, the input data containing geometric measurements 520 and other data, such as, for example texture information 530.

The predictor 540, for at least one of the images (or other data associated to a face, such as 3D-point clouds), predicts one or more facial parameters 541 on the basis of facial parameters 542 predicted and/or corrected in correspondence of previous images (or other data associated to a face, such as 3D-point clouds).

The KF 501 classifies images (or other data associated to a face, such as 3D-point clouds) or part of thereof to obtain other information, such as, for example, texture information, in particular by classifying facial expressions according to action unit, AU, classes. The KF 501 calculates the probability and/or the intensity of at least an AU class.

The KF 501 modifies facial parameters obtained in correspondence of previous images (or other data associated to a face, such as 3D-point clouds) on the basis of a function, or a Jacobian expression thereof, that is based on the dynamics of the facial movements.

The KF 501 can use covariances of disturbance, or the cumulative effect thereof, during the interval from two consecutive images (or other data associated to a face, such as 3D-point clouds), to calculate covariances of errors of predicted facial parameters.

The KF 501 can use covariances of errors in acquiring measurements to update covariances of errors of predicted facial parameters.

Covariances of errors in acquiring measurements can contain covariances of errors in acquiring the geometric measurements and covariances of errors in values associated to the other data, such as, for example texture information.

Covariances R of probabilistic values associated to the other data (in particular texture information) can also be used.

AU parameters can be extracted at 580. On the basis of comparisons with AU thresholds, a set of active AUs 591 can be obtained at 590.

At step 505, measurements are performed on image (or other data associated to a face, such as 3D-point clouds) frames to obtain landmark positions 520 and other (e.g., texture) information 530.

A predict step (e.g., step 540) at instant $t_k$ can be:

$$\hat{x}_{k|k-1} = f(\hat{x}_{k-1|k-1}) + w_k$$

where $\hat{x}_{k|k-1}$ refers to the face model parameters at time $t_{k-1}$; f describes the dynamics of face model parameters (how they change from time $t_{k-1}$ to $t_k$); and $\hat{x}_{k|k-1}$ is the prediction of face model based on f and $\hat{x}_{k-1|k-1}$; $w_k$ is the noise (or uncertainty) in f. Therefore, f is an approximation, and $w_k$ is an error. Assuming $w_k$ as Gaussian with mean error equal to zero, variations can be expressed by matrix:

$$P_{k|k-1} = F_k P_{k-1|k-1} F_k^T + Q_k$$

where $P_{k-1|k-1}$ is a matrix with covariance of errors in $\hat{x}_{k-1|k-1}$, $P_{k-1|k-1}$ is a matrix with covariances of errors of $\hat{x}_{k|k-1}$, and $F_k$ the Jacobian matrix of f with respect to $\hat{x}_{k-1|k-1}$.

Finally, a prediction of a face model is obtained at time $t_k$ and an estimate of the error. It is now possible to update the values (step 550):

$$Z_k = h(x_k) + v_k$$

where $Z_k$ contains measurements at instant k.

For the geometric measurements 520, $Z_k$ can contain 2D coordinate positions of a number (e.g., 68) facial feature points (landmarks). For the other information, such as texture information 530, $Z_k$ can contain probability outputs from different SVM (support vector machines).

Further, h describes a relationship between face model parameters and measurements. For the geometric measurements 520, h can be expressed as equation (2) (see below). For the other information, such as texture information 530, h can be an identity function: if SVM provides a probability output for an AU, then $h(x_k)$ is equal to the face model parameter of the AU in the state vector $x_k$.

Further, $v_k$ is the noise in measurements. It has been noted that tit can be assumed to be Gaussian-distributed with zero-mean.

According to the invention, for geometric measurements 520, covariance can be inserted in matrix $R_k$ describing covariance of between errors in 2D coordinate positions of different facial feature points (landmarks). These are computed by running a facial feature point detection algorithm on an annotated dataset. See below (in particular, section "Noise covariance for geometric measurements") and FIG. 6.

For other information, such as texture information 530, in order to get the covariances, the variance of the Bernoulli distribution defined by SVM outputs are computed. This variance is used as the variance of Gauss-distributed noise associated with other information, such as texture measurements.

Hence, as output 542 of the step 542, it is possible to have a corrected state value at time $t_k$. A corrected estimate of the face model parameters is obtained together with a correct estimate of the error.

4.6 Discussion on Embodiments of the Invention

According to an aspect of the invention, an Extended Kalman Filter (EKF) can be used to track parameters of a face model consisting of AU-based deformation vectors. The model parameters can constitute the set of hidden random variables. The 2D positions of landmarks in images (or other data associated to a face, such as 3D-point clouds) can constitute a set of observed random variables. Landmark positions can be measured by an independent measurement process. The EKF can be used to infer the hidden model parameters from the noisy measurements of landmark positions. FIG. 2 presents a generic outline of the approach in the form of a block diagram.

The predict step of the EKF applies a dynamic model of parameter evolution to propagate the state estimates from the previous frame to the current frame. These estimates are then updated based on the measurement (observation). The relationship between the measurement and the model parameters is given by the model equation. State constraints help to incorporate additional information about the parameters, for example the range of permissible values for a parameter. The output of the correct step gives the final parameter estimates for the current frame. The estimates for AU parameters represent the intensities of expression of the different AU. Suitable thresholds can be applied to each AU parameter to decide which of them are active.

4.7 Discrete Kalman Filter

The discrete KF is a linear, recursive state estimator. It is used for estimating the state of a linear, continuous-time, random process at discrete points in time (time steps). It models the process dynamics in the form of a linear, recursive relationship between its states at successive time steps. The randomness associated with the process is modelled as the disturbance caused by an external white noise signal affecting the process during the interval between the time steps. The process model is given by Equation 10.

$$x^{(k+1)} = F^{(k)} * x^{(k)} + B^{(k+1)} * u^{(k+1)} + w^{(k)} \quad (10)$$

$x^{(k+1)}$ is the state of the process at time step k+1

$x^{(k)}$ is the state of the process at time step k $F^{(k)}$ is the state transition matrix for the time interval ($t^{(k)}$, $t^{(k+1)}$]

$u^{(k+1)}$ is the external control command given at time step k+1

$B^{(k+1)}$ maps the control command at time step k+1 to state update $w^{(k)}$ is the white noise sequence affecting the process during ($t^{(k)}$, $t^{(k+1)}$]

where:

The discrete-time white noise sequence $w^{(k)}$ can be a cumulative sum (or, integral) of the continuous-time white noise signal affecting the process during the interval between the time steps k and k+1 gives. The control command is here absent, and therefore the term involving u in the process model is ignored, from hereon.

The process model does not always provide an accurate or complete description of the random process. An independent measurement of the observable components of the process and its outputs is used to correct/update/improve the state estimates obtained using the process model.

In most cases, the components constituting the state vector are either fully or partially hidden, i.e. cannot be observed or measured directly. Therefore, the measurement vector and the state vector are mostly not identical. The discrete KF can assume a linear relationship between the state and the measurement. In the real case, the measurements are also noisy. The noise in the measurements are assumed to be white, and uncorrelated to the noise in the process model. The measurements, taken at discrete time steps, are modelled as given by Equation 11.

$$z^{(k)} = H^{(k)} * x^{(k)} + v^{(k)} \quad (11)$$

where $z^{(k)}$ represents the measurement at time step k $x^{(k)}$ represents the state of the process line at time step k $H^{(k)}$ gives the linear relationship between state and measurement at time step k $v^{(k)}$ represents the white noise affecting the measurement at time step $t^{(k)}$ The process noise $w^{(k)}$ and the measurement noise $v^{(k)}$ can be assumed to be white sequences having zero mean and known covariance matrices $Q^{(k)}$ and $R^{(k)}$, respectively. The covariance matrix $Q^{(k)}$ can describe the cumulative effect of the continuous-time white noise (disturbance) affecting the process during the interval ($t^{(k)}$, $t^{(k+1)}$].

In the process and measurement models described above, $x^{(k)}$ can represent the true state of the system at time step k, which, in majority of the real cases, cannot be determined exactly. It is, at most, only possible to provide some best estimate $\hat{x}^{(k)}$ of the state, along with a measure of the uncertainty associated with the estimate. To represent the uncertainty in the state estimate, the discrete KF uses an error covariance matrix, along with the assumption that the mean of the error in the estimate for each component of the state vector is zero. Given an initial estimate of the state and the uncertainty associated with it, the discrete KF, operating under optimal conditions, produces, at any time step k, estimates of the state that are optimal in the least mean square sense. The sum of the variances of the errors in each component of the estimated state vector is the expression that is minimised. This can be understood as being the trace of the associated estimation error covariance matrix $P^{(k)}$.

The operation of the discrete KF involves two main steps, namely, the predict step and the correct step. In the predict step (e.g., performed by predictor 240 or 540), the discrete KF uses the process model to project the estimate of the state and its uncertainty from the previous time step to the current time step. The estimate so obtained is called the a priori estimate (e.g., 241, 541), and is the estimate available prior to the incorporation of the current measurement. The computations involved in the predict step are given by Equations 12 and 13, in which, $\hat{x}$ represents an estimate of the state, and the superscript $^-$ indicates that these are the a priori estimates. If the estimate available at the previous time step was optimal, then the a priori estimate for the current time step is also optimal, by virtue of the process model.

$$\hat{x}^{-(k+1)} = F^{(k)} * \hat{x}^{+(k)} \quad (12)$$

$$P^{-(k+1)} = F^{(k)} * P^{(k)} * (F^{(k)})^T + Q^{(k)} \quad (13)$$

In the correct step (e.g., performed by the corrector 250 or 550), the discrete KF improves the a priori estimate by incorporating the measurement at the current time step. The improved estimate so obtained is called the a posteriori estimate. The improvement in the estimate comes from the difference between the actual measurement and the measurement predicted by the a priori estimate of the state. This difference is called innovation, and a certain proportion of it is used to update the state estimate, as shown in Equation 14. The superscript $^+$ here indicates that the values are a posteriori estimates.

$$\hat{x}^{+(k)} = \hat{x}^{-(k)} + K^{(k)} * (z^{(k)} - H^{(k)} * \hat{x}^{-(k)}) \quad (14)$$

The proportion that gives the optimal a posteriori estimate is called the Kalman gain, which is computed as shown in Equation 15. The Kalman gain minimises the trace of the estimation error covariance matrix associated with the a posteriori estimate. Accordingly, the estimation error covariance matrix associated with the optimal a posteriori state estimate is given by Equation 16. The optimal a posteriori estimate of the state is computed by using Equation 14 with $K^{(k)}$ equal to $K_{optimal}^{(k)}$.

$$K_{optimal}^{(k)} = P^{-(k)} (H^{(k)})^T (H^{(k)} P^{-(k)} (H^{(k)})^T + R^{(k)})^{-1} \quad (15)$$

$$P^{+(k)} = (I - K_{optimal}^{(k)} * H^{(k)}) * P^{-(k)} \quad (16)$$

The optimal estimates were obtained by minimising the trace of $P^+$. These state estimates also correspond to the expected value of the state, given the history of measurements. If the conditional probability density function of the state, given the measurement history, is Gaussian (in this case, the white noise sequences $w^{(k)}$ and $v^{(k)}$ are also Gaussian distributed), then the optimal estimates correspond to the most probable values (Since the peak of the Gaussian occurs at the expected value), and the discrete KF is the best state estimator. The covariance of the multi-dimensional Gaussian is given by the estimation error covariance matrix.

The computation of the a posteriori estimate, given in Equation 14, can be rewritten as in Equation 17. It can be seen that the a posteriori estimate is a linear, weighted combination of the a priori estimate and the measurement.

$$\hat{x}^{+(k)} = (I - K^{(k)} * H^{(k)}) * \hat{x}^{-(k)} + K^{(k)} * z^{(k)} \quad (17)$$

From Equation 17, the contribution of the actual measurement to the a posteriori state estimate is decided by the filter gain $K^{(k)}$. As mentioned earlier, in the optimal case, $K^{(k)}$ is the Kalman gain. Since the measurement noise covariance matrix R appears in the denominator of the Kalman gain (see Equation 15), the lower the measurement noise, the higher the Kalman gain, and the greater the contribution of the actual measurement to the improved state estimate. In other words, the lower the measurement noise, the greater the "trust" in the actual measurement. Similarly, the lower the noise in the a priori state estimate (relative to the noise in the actual measurement), the lower the Kalman gain, and the closer the a posteriori estimate is to the a priori estimate.

4.8 Extended Kalman Filter

The discrete KF assumes that the process has linear dynamics and that the relationship between the state and the measurement is also linear. However, in several practical applications, at least one of these is nonlinear. One of the ways to deal with nonlinear system, is to linearise the nonlinear process and measurement models. The Extended Kalman Filter (EKF) linearises the process and measurement models around the current state estimate.

The nonlinear process and measurement models are given by Equations 18 and 19, respectively. In these equations, f represents the nonlinear state transition function and h represents the nonlinear state-measurement relationship.

$$x^{(k+1)} = f(x^{(k)}) + w^{(k)} \tag{18}$$

$$z^{(k)} = h(x^{(k)}) + v^{(k)} \tag{19}$$

The EKF uses the nonlinear function f to propagate the state estimates from the previous time step to the current time step. However, to propagate the associated estimation error covariance matrix, the first-order approximation of the Taylor series expansion of f about the point $\hat{x}^{+(k)}$ is used at time step k+1. The equations involved in the predict step are, therefore, given by Equations 20 and 21. $J_f(x)$ denotes the Jacobian of f w.r.t the state vector x, and it is evaluated at $x = \hat{x}^{+(k)}$.

$$\hat{x}^{-(k+1)} = f(\hat{x}^{+(k)}) \tag{20}$$

$$P^{-(k+1)} = J_f(x)|_{x=\hat{x}^{+(k)}} * P^{+(k)} * (J_f(x)|_{x=\hat{x}^{+(k)}})^T + Q^{(k)} \tag{21}$$

Similarly, the nonlinear function h is used to predict the measurement based on the a priori state estimate. The first-order approximation of the Taylor series expansion of h about $\hat{x}^{-(k)}$ is used to compute the covariance matrices involved in the correct step at time step k. The equations used in the correct step of the EKF are similar to those involved in the correct step of the discrete KF. Assuming that the errors introduced by the approximations are small, the EKF uses equations similar to the optimal version of the discrete KF, to obtain approximately optimal estimates for the state. Equations 22-25 are used by the EKF to obtain the approximately optimal a posteriori estimates. In these equations, $J_h(x)$ denotes the Jacobian of h w.r.t the state vector x, and it is evaluated at $x = \hat{x}^{-(k)}$.

$$S^{(k)} = J_h(x)|_{x=\hat{x}^{-(k)}} * P^{-(k)} * (J_h(x)|_{x=\hat{x}^{-(k)}})^T + R^{(k)} \tag{22}$$

$$K^{(k)} = P^{-(k)} * (J_h(x)|_{x=\hat{x}^{-(k)}})^T * (S^{(k)})^{-1} \tag{23}$$

$$\hat{x}^{+(k)} = \hat{x}^{-(k)} + K^{(k)} * (z^{(k)} - h(\hat{x}^{-(k)})) \tag{24}$$

$$P^{+(k)} = (I - K^{(k)} * J_h(x)|_{x=\hat{x}^{-(k)}}) * P^{-(k)} \tag{25}$$

4.9 Constrained Kalman Filter

It may be the case that, the state estimation problem to which the discrete KF or its variant is being applied, includes additional information about the system, beyond what is already modelled. These might be a set of linear or nonlinear, equality or inequality constraints that should be satisfied by the state of the process at any time step. Incorporation of these constraints into the recursive predict-correct loop of the KF and its variants, is essential in order to obtain more realistic estimates of the state at any time step. A number of methods have been proposed in literature for incorporating state constraints, a survey of which is presented in. In this section, a brief overview of some of these methods is provided.

Linear equality and inequality constraints are expressed as shown in Equations 26 and 27, respectively, where D is the matrix of constraint coefficients, and d is the vector of constants.

$$D * x^{(k)} = d \tag{26}$$

$$D * x^{(k)} \leq d \tag{27}$$

Nonlinear equality and inequality constraints are expressed as shown in Equations 28 and 29, respectively, where g is the nonlinear, multidimensional constraint function and h is the vector of constants.

$$g(x^{(k)}) = h \tag{28}$$

$$g(x^{(k)}) \leq h \tag{29}$$

Incorporating linear equality constraints into a discrete KF is the simplest of all cases.

4.10 The KF for Estimation of Facial Parameters

Key components of the process model of an EKF include the state vector $x^{(k)}$, the state transition function f that predicts the current state based on the state estimate at the previous time step, and the process noise covariance matrix $Q^{(k)}$. The form of the state vector and the state transition function, as applied to the problem at hand, are discussed in this section.

An EKF can be used to estimate the parameters of the AUSU Model. These parameters can include 3D pose parameters, the scaling factor, AU parameters and SU parameters. Each of these parameters can be treated as a random variable. A constant velocity motion model can be used for estimating the rigid and AU parameters. A constant position model can be used for estimating the SU parameters. The choice of process models for the parameters can be based on their physical meaning. The rigid parameters represent the size and pose of the head, and the AU parameters represent the intensities of various facial actions. These parameters are expected to vary according to the movement of the head and facial muscles. The SU parameters represent the person-specific facial shape, and are not expected to vary over time. The constant velocity model and the constant position model are described below. A simple scenario involving a single random variable X is considered. A mass spring damper model is discussed in following sections.

Adopting a constant velocity motion model, the state vector $x^{(k)}$ can consist of two elements, namely the values of the random variable X and its velocity $\dot{X}$ at time step k (see Equation 30). The state transition function f can be defined based on the assumption that the velocity or the time rate of change of the value of the variable X is constant during the time interval $\Delta t$ between two consecutive time steps. Assuming linear motion, f is defined by the equation of motion along a straight line under constant velocity (see Equation 31).

$$x_{cvel}^{(k)} = \begin{bmatrix} x^{(k)} \\ \dot{x}^{(k)} \end{bmatrix} \tag{30}$$

$$\hat{x}^{-(k+1)} = \hat{x}^{+(k)} + \Delta t \cdot \hat{\dot{x}}^{+(k)} \tag{31}$$

$$\hat{\dot{x}}^{-(k+1)} = \hat{\dot{x}}^{+(k)}$$

$$\hat{x}_{cvel}^{-(k+1)} = f(\hat{x}_{cvel}^{+(k)}) = \begin{bmatrix} 1 & \Delta t \\ 0 & 1 \end{bmatrix} * \hat{x}_{cvel}^{+(k)}$$

Adopting a constant position motion model, the state vector $x^{(k)}$ can consist of only a single element, namely the value of the random variable X at time step k (see Equation 32). The state transition function f can be the identity function, due to the assumption that the value of the variable X remains constant during the time interval Δt between two consecutive time steps (see Equation 33).

$$x_{cpos}^{(k)} = [x^{(k)}] \quad (32)$$

$$\hat{x}^{-(k+1)} = \hat{x}^{+(k)}$$

$$\hat{x}_{cpos}^{-(k+1)} = f(\hat{x}_{cpos}^{+(k)}) = \hat{x}_{cpos}^{+(k)} \quad (33)$$

An AUSU Model can consist of six pose parameters, one scaling factor, 22 AU parameters and 61 SU parameters. The use of the constant velocity motion model for the rigid and AU parameters, and the constant position model for the SU parameters, resulted in a state vector $x^{(k)}$ that can contain 119 elements (2*7+2*22+61=119). Equation 34 describes the state vector symbolically. In Equation 34, θ denotes an angle of rotation, t denotes a component of translation vector and α denotes the scale factor. None of the components of the state vector are directly observable (see Section 2.2).

$$x_{119\times1}^{(k)} = [(x_{cvel_{rigid}}^{(k)})^T (x_{cvel_{AU}}^{(k)})^T (x_{cpos_{SU}}^{(k)})^T]^T;$$

$$x_{cvel_{rigid}}^{(k)} = [\theta_X^{(k)} \dot{\theta}_X^{(k)} \theta_Y^{(k)} \dot{\theta}_Y^{(k)} \theta_Z^{(k)} \dot{\theta}_Z^{(k)} t_X^{(k)} \dot{t}_X^{(k)} t_Y^{(k)} \dot{t}_Y^{(k)} t_Z^{(k)} \dot{t}_Z^{(k)} \alpha^{(k)} \dot{\alpha}^{(k)}]^T;$$

$$x_{cvel_{AU}}^{(k)} = [\alpha_1^{(k)} \dot{\alpha}_1^{(k)} \alpha_2^{(k)} \dot{\alpha}_2^{(k)} \ldots \alpha_{22}^{(k)} \dot{\alpha}_{22}^{(k)}]^T;$$

$$x_{cpos_{SU}}^{(k)} = [s_1^{(k)} s_2^{(k)} \ldots s_{61}^{(k)}]^T \quad (34)$$

The state transition functions for the rigid and AU parameters have the form given in Equation 31, and those for the SU parameters have the form given in Equation 33. These are linear equations and therefore, the state transition function can be replaced with the state transition matrix $F^{(k)}$ at time step k. Equation 35 describes $F^{(k)}$ symbolically.

$$F^{(k)} = \begin{bmatrix} F_{cvel}^{(1)(k)} & & & & & & \\ & F_{cvel}^{(2)(k)} & & & & & \\ & & \ddots & & & & \\ & & & F_{cvel}^{(29)(k)} & & & \\ & & & & F_{cpos}^{(1)(k)} & & \\ & & & & & F_{cpos}^{(2)(k)} & \\ & & & & & & \ddots \\ & & & & & & & F_{cpos}^{(61)(k)} \end{bmatrix}; \quad (35)$$

$$F_{cvel}^{(i)(k)} = \begin{bmatrix} 1 & \Delta t \\ 0 & 1 \end{bmatrix} \forall i \in \{1, 2, \ldots, 29\};$$

$$F_{cpos}^{(j)(k)} = [1] \forall j \in \{1, 2, \ldots, 61\}$$

Since the process model is linear, the equations used in the predict step of the EKF are same as those of the classical KF. That is, instead of Equations 20 and 21, the Equations 12 and 13, respectively, are used in the predict step of the proposed approach.

In one example, the constant velocity model can be used for head pose parameters (e.g., angles of rotations), constant position model can be used for SU parameters (shapes that do not change over time), and mass spring damper model for AU parameters (see below).

4.11 Measurement Model

Components of the measurement model of an EKF include a measurement vector $z^{(k)}$, a measurement noise covariance matrix $R^{(k)}$, and a function h to predict the measurement based on the current state estimate.

In the proposed approach, 2D positions of facial landmarks in the $k^{th}$ image (or other data associated to a face, such as 3D-point cloud) frame constitute the geometrical measurement at time step k. The face models used in this work are composed of 68 landmarks (other configurations are possible). $z^{(k)}$ can be described symbolically by Equation 36. 2D landmark positions can constitute a part of a set of observed random variables.

However, according to the invention, also other information, such as texture information, is to be used. It is possible to $$z^{(k)}[x_1^{(k)} y_1^{(k)} x_2^{(k)} y_2^{(k)} \ldots x_{68}^{(k)} y_{68}^{(k)} I1^{(k)} I2^{(k)} I3^{(k)}] \quad (36)$$

$I1^{(k)}$, $I2^{(k)}$, $I3^{(k)}$ represent other information (such as texture information) values (there could also be further or less other information values). Texture information values can be, for example, outputs of SVM.

The state vector $x^{(k)}$ includes parameters of the AUSU Model. Substituting the estimates of the parameters in the model equation, gives the 3D positions of landmarks. These were projected onto the image frame using the appropriate camera projection matrix (see equation 2).

Since the computation of each element of the predicted measurement vector $\hat{z}^{(k)}$ is independent of the other elements of $\hat{z}^{(k)}$, h can be decomposed into a set of subfunctions that can be expressed in a vector such as $[h_1(x^{(k)}), h_2(x^{(k)}), h_3(x^{(k)}) \ldots]^T$.

h is nonlinear, and therefore its Jacobian, computed at the current a priori state estimate, is used in the update equations of the EKF. The Jacobian $\mathcal{J}_h(x)|_{x=\hat{x}^{-(k)}}$ can be computed using the finite difference approximation of the first-order partial derivatives. $\mathcal{J}_h(x)|_{x=\hat{x}^{-(k)}}$ is a rectangular matrix. Since h does not depend on the velocities of the rigid and AU parameters, the corresponding columns in the Jacobian are zero.

4.12 Initial State and Uncertainty

This subsection discusses the choice of the initial state $x^{(0)}$ and the uncertainty associated with it. As described above, the state vector x can contain 119 elements. The first 14 elements are the rigid parameters and their velocities. The next 44 elements are the AU parameters and their velocities. The last 61 elements are the SU parameters. The rigid parameters were initialised to the values obtained from the initial fit of the PDM model. All the other elements, namely the AU and SU parameters, and the velocities of the rigid and AU parameters, were initialised to 0.

Thus, the initial state vector $\hat{x}^{+(0)}$ has the form given in Equation 38.

$$\hat{x}_{119\times1}^{+(0)} = [\theta_X 0 \; \theta_Y 0 \; \theta_Z 0 t_X 0 t_Y 0 t_Z 0 1.00 \ldots 0]^T \quad (38)$$

The uncertainty in the initial state is expressed through the corresponding a posteriori estimation error covariance matrix $P^{+(0)}$. The errors in the initial estimates of state variables were assumed to be independent. Therefore, $P^{+(0)}$ is a 119×119 diagonal matrix. The entries along the principal diagonal are as given in Table 2. The variances for the error in the initial estimates of the rigid and AU parameters are much lower than those for the corresponding velocities, indicating a higher uncertainty in the initial velocity estimates.

| State Variables | $\sigma^2$ | Units |
|---|---|---|
| Rotation: X, Y, Z | 0.07 | $rad^2$ |
| Rotation velocities: X, Y, Z | 63 | $\left(\frac{rad}{s}\right)^2$ |
| Translation: X, Y, Z | 0.0025 | $m^2$ |
| Translation velocities: X, Y, Z | 2.25 | $\left(\frac{m}{s}\right)^2$ |
| Scale | 0 | unitless |
| Scale velocity | 0 | $s^{-2}$ |
| AUlbl | 0.11 | unitless |
| AUlbl velocities | 99 | $s^{-2}$ |
| SUlbl | 1.0 | unitless |

(Variances used in the diagonal matrix $P^{+(0)}$. $\Delta t$ is the inverse of frame rate)

4.13 Process Noise Covariance Matrix, Q

The process noise covariance matrix, $Q^{(k)}$, for a discrete-time system that samples a continuous-time process, can aggregate the effects (randomness) of the zero-mean Gaussian white noise entering the system from various sources during the time interval $(t_k, t_{k+1}]$. In the constant position process model, the white noise sources affect the position estimates directly. In the constant velocity process model, the white noise sources are assumed to directly affect only the velocity estimates. The noisy velocity estimates affect the position estimates according to the position-velocity relationship. The form of the process noise covariance matrix for the constant position and constant velocity process models are illustrated by Equations 39 and 40, respectively, for a simple case involving a state variable (X) and its velocity ($\dot{X}$) (in Equations 39 and 40, $x^{(k)}$ denotes the value taken by x at time step k, and $\dot{x}^{(k)}$ denotes the value taken by $\dot{x}$ at time step k. In other words, $x^{(k)}$ and $\dot{x}^{(k)}$ are the realisations of x and $\dot{x}$, respectively, at time step k). $\sigma_X^2$ and $\sigma_{\dot{X}}^2$ represent the combined variances of the input Gaussian white noise entering the system from various sources, for the constant position and constant velocity models, respectively. These variances are assumed to be constant and known beforehand. The matrices involving the $\Delta t$ terms perform the aggregation of noise over the time interval $(t_k, t_{k+1}]$.

$$1Q_{cpos}^{(k)} = [\Delta t] \cdot \sigma_X^2 \quad (39)$$

$$Q_{cvel}^{(k)} = \begin{bmatrix} \frac{(\Delta t)^3}{3} & \frac{(\Delta t)^2}{2} \\ \frac{(\Delta t)^2}{2} & \Delta t \end{bmatrix} \cdot \sigma_{\dot{X}}^2 \quad (40)$$

As discussed above, the rigid parameters as well as the AU parameters are modelled using the constant velocity process model, whereas the SU parameters are modelled using the constant position process model. Therefore, the process noise covariance matrix $Q^{(k)}$, at any time step k, is a 119×119 matrix, represented symbolically by Equation 41. The submatrix $Q_1^{(k)}$ is a block diagonal matrix of size 58×58, with 2×2 blocks (of the form given in Equation 40) on the principal diagonal. The submatrix $Q_2^{(k)}$ is a diagonal matrix with elements of the form given in Equation 39 on its principal diagonal. Independence was assumed between every pair of parameters of the AUSU Model. In addition, the velocities of rigid and AU parameters were assumed to be dependent only on the corresponding parameters. This explains the shape of the process noise covariance matrix $Q^{(k)}$.

$$Q_{119 \times 119}^{(k)} = \begin{bmatrix} Q_1^{(k)} & 0 \\ 0 & Q_2^{(k)} \end{bmatrix}; \quad (41)$$

$$Q_1^{(k)} = \begin{bmatrix} Q_{cvel_1}^{(k)} & & & \\ & Q_{cvel_2}^{(k)} & & \\ & & \ddots & \\ & & & Q_{cvel_{29}}^{(k)} \end{bmatrix};$$

$$Q_2^{(k)} = \begin{bmatrix} Q_{cpos_1}^{(k)} & & & \\ & Q_{cpos_2}^{(k)} & & \\ & & \ddots & \\ & & & Q_{cpos_{61}}^{(k)} \end{bmatrix}$$

The values used as the input noise variances are listed in the table below. These values were tuned manually through trial and error. As is evident from the table, the input noise variances for similar types of parameters can be set identically. The following table also shows that the input noise variance for SU parameters was several orders of magnitude lower than that for AU parameters. This was done to model the constancy of SU parameters over time. It also enables the slow adaptation of SU parameters to the face.

| Model Parameters | Process Model | $\sigma^2$ | Units |
|---|---|---|---|
| Rotation: X, Y, Z | Constant velocity | 9 | $\left(\frac{rad}{s}\right)^2$ |
| Translation: X, Y, Z | Constant velocity | 0.09 | $\left(\frac{m}{s}\right)^2$ |
| Scale | Constant velocity | 0 | unitless |
| AU | Constant velocity | 27 | unitless |
| SU | Constant position | 0.000018 | unitless |

(Values of input noise variances used to construct the process noise covariance matrix $Q^{(k)}$)

4.14 Noise Covariance for Geometric Measurements

The elements of the measurement noise covariance matrix R can be computed empirically. The PDM of 30 modes of shape variation can fitted using the RLMS algorithm on the annotated CK+ database. In an example, there were 593 image sequences from 123 subjects, with the frames from all the sequences totalling to 10,734. All but one frame had been annotated with the 2D positions (at subpixel accuracy) of all 68 facial landmarks. The annotations also included the 2D positions of eyes, nose tip and mouth corners. The frames contained only nearly frontal faces.

The annotated landmark positions were taken as the true values, and the positions returned by the RLMS fitting algorithm were taken as the measured values. The absolute error observed in the X and Y coordinates of each of the 68 landmarks was computed for each frame, using the Formula 42. The errors computed for each frame were then normalised relative to the distance (at subpixel accuracy) between the corresponding annotated positions of the eyes (see Formula 43).

$$\begin{bmatrix} \Delta x_{i,f} \\ \Delta y_{i,f} \end{bmatrix} = \begin{bmatrix} x_{i,f}^{(m)} \\ y_{i,f}^{(m)} \end{bmatrix} - \begin{bmatrix} x_{i,f}^{(a)} \\ y_{i,f}^{(a)} \end{bmatrix} \qquad (42)$$

where:
subscript i denotes the landmark no. ranging from 1 to 68
subscript f denotes the frame no. ranging from 1 to 10,733
superscript (m) denotes measured values
superscript (a) denotes annotated values $$\begin{bmatrix} \Delta x'_{i,f} \\ \Delta y'_{i,f} \end{bmatrix} = \frac{1}{d_f^{(a)}} \cdot \begin{bmatrix} \Delta x_{i,f} \\ \Delta y_{i,f} \end{bmatrix} \qquad (43)$$

where:
subscript i denotes the landmark no. ranging from 1 to 68
subscript f denotes the frame no. ranging from 1 to 10,733
$d_f^{(a)}$ denotes the distance between the annotated positions of eyes The empirical mean and covariance of the normalised errors observed in the X and Y coordinates of each of the 68 landmarks were then computed using the Formulae 44 and 45, respectively. For simplicity, the landmarks were assumed to be independent. However, the X and Y coordinates of each landmark were considered to be correlated.

$$\begin{bmatrix} \overline{\Delta x_i} \\ \overline{\Delta y_i} \end{bmatrix} = \frac{1}{N_f} \cdot \sum_{f=1}^{N_f} \begin{bmatrix} \Delta x'_{i,f} \\ \Delta y'_{i,f} \end{bmatrix} \qquad (44)$$

$$\text{cov}(u'_i, v'_i) = \sigma_{u'_i v'_i} = \frac{1}{N_f - 1} \cdot \sum_{f=1}^{N_f} (u'_{i,f} - \overline{u}_i)(v'_{i,f} - \overline{v}_i) \qquad (45)$$

In Formulae 44 and 45:
subscript i denotes the landmark no. ranging from 1 to 68
subscript f denotes the frame no. ranging from 1 to 10,733
$N_f$ equals the total no. of frames, that is, 10,733
u, v are symbolic variables that can take the values $\Delta x$, $\Delta y$ Assuming an independence between landmarks, the measurement noise covariance matrix R is a block diagonal matrix, with 2×2 blocks along its principal diagonal. Each 2×2 block represents the measurement noise covariance matrix of the X and Y coordinates of the corresponding landmark, and is computed at each time step k, by scaling the normalised empirical covariances by the square of the distance between the eyes. The distance ($d^{(m)^{(k)}}$) between the eyes (at subpixel accuracy) is determined based on the measured values of positions of certain landmarks at that time step. Equation 46 describes R symbolically (only the portion for geometrical measurements).

$$R_{136 \times 136}^{(k)} = \begin{bmatrix} \sum_{2 \times 2}^{(1)^{(k)}} & & & \\ & \sum_{2 \times 2}^{(2)^{(k)}} & & \\ & & \ddots & \\ & & & \sum_{2 \times 2}^{(68)^{(k)}} \end{bmatrix}; \qquad (46)$$

$\forall i \in \{1, 2, \ldots, 68\}$, $$\sum_{2 \times 2}^{(i)^{(k)}} = \begin{bmatrix} \sigma_{X_i X_i}^{(k)} & \sigma_{X_i Y_i}^{(k)} \\ \sigma_{Y_i X_i}^{(k)} & \sigma_{Y_i Y_i}^{(k)} \end{bmatrix} \approx \begin{bmatrix} \sigma_{\Delta x'_i \Delta x'_i} & \sigma_{\Delta x'_i \Delta y'_i} \\ \sigma_{\Delta y'_i \Delta x'_i} & \sigma_{\Delta y'_i \Delta y'_i} \end{bmatrix} \cdot d^{(m)^{(k)}} \cdot d^{(m)^{(k)}}$$

FIG. 6 shows measurement noise 600: 1-σ error ellipses 601 for each of 68 landmarks 602, for an eye distance of 227.238 pixels. The underlying 2D wireframe model is the projection of the 3D model of the neutral face onto a plain image of aspect ratio 1.

4.15 Noise Covariance for the Other Information

In order to obtain elements of the R matrix for the other information (such as texture information), the variance of the Bernoulli distribution defined by SVM outputs is calculated. This variance is used in the matrix as the variance of Gaussian distributed noise associated with other (e.g., texture) measurement.

According to the invention, equation (46) can be completed by adding single diagonal values in which the values are obtained by mapping probability of success values into variance values according as shown in FIG. 8.

4.16 Overview of the Invention

The present invention can be based, inter alia, on fusing shape (geometric) and other information, such as information based on appearance (texture) features for AU detecting. In particular, the invention is based on fusing probability outputs from SVMs within a continuous state estimation framework for AU estimation. A biomechanical model of dynamics of facial motion that captures the visco-elastic properties of facial muscles can also be used.

Fusion of geometric and other (e.g., texture) information can be viewed as a sensor fusion problem. Traditionally, state estimation methods are used to perform sensor fusion, for example in applications like robot navigation and satellite tracking. Here, a combination of machine learning and model-based approach can be used.

The inventive model-driven approach has the advantage that less data and less training time are are involved. Given a good model, it captures relevant aspects of the application domain. For example, an anatomically inspired model for facial deformations captures the underlying properties of facial motion. Static approaches exclude temporal aspects of facial motion, which can help automated approaches to disambiguate facial expressions. Humans rely strongly on temporal aspects to interpret social cues from faces. Restricting facial analysis to binary decisions would exclude the possibility to evaluate more subtle and continuous aspects of facial motion such as variations in intensities.

For example, intensity information can be used to discriminate between posed and spontaneous expressions. In light of these arguments, an AU-model based continuous state estimation framework for capturing static and dynamic anatomical properties of facial motion, which provides estimates for AU intensities, has been developed.

Detecting action units under real conditions without the need for explicitly adapting the system to the monitored person, can be challenging. Since the control on the environment is small, the system has to tackle several challenges. Therefore, it consists of different parts. FIG. 7 shows a flow chart of the system.

A video capture device 705 can acquire facial images (in the present section, reference is made to "images"; however, other representations can be used, such as 3D-point clouds; of course, in that case, the device 705 is substituted by an appropriate hardware sensor).

A face detection unit 710 can process the image frames provided by the video capture device 705. It is possible to use known algorithms (e.g., SHORE™) to locate the person's face in the image and obtain the region of the face. In addition, algorithms such as SHORE™ provide the location of the eyes, nose and mouth corners in case a face could be found. If more than one face is present, then the face detector selects the most prominent face on the basis of the face size in the image. If no face is detected, then the frame is not processed further. Failure to detect a face can be caused due to several reasons; for example, occlusion of the face(s), bad illumination, and blur caused by fast head motion.

A face normalization unit 720 can rotate and scale the person's face using facial feature points provided by SHORE™ as reference points. Thus, the normalized image can have the same resolution and pose. In this way, at least some of the variations in the appearance of the face that are caused by head rotations and movements of the person in front of the video capture device, are mitigated.

A Facial feature point detector 730 can determine the location of additional facial feature points within the detected face region. These points cover the whole face and track the location of prominent spots on the human face (lip boundaries, eye brows, chin, etc.). Changes in the location of these points from one frame to another provide information about facial motion and the activated AUs.

However, it is not possible to detect all AUs just by observing motion in these facial feature points, since some of them are more prominently expressed by wrinkles. Such AUs are easier to recognise from the transient changes in the appearance of the face; for example, "AU06-Cheek Raiser" is easily recognised from the appearance of wrinkles around the eye corners. So, in addition to the facial feature points, the facial texture is analysed at texture classification unit 740. Classifiers trained on texture features are used for detecting AUs. Other solutions are although possible (e.g., when texture information is not used, but other data such as physiological data, gesture data, posture data, or audio data are used, the associated hardware is used).

An action unit detector 750 can fuse the outputs from the facial feature point detector 730 and the texture classification unit 740 (or another classification unit which is not based on texture information) to make a final decision about the intensity of each AU in a pre-defined set of AUs.

During this step, an internal model of the facial morphology of the person can also be taken into account. This model of the person's "neutral" face is determined over time and helps to calibrate the system to the person's face at runtime. This online calibration is advantageous, because it would otherwise be difficult to acquire a neutral face on demand.

According to the invention, observations (measurements) from two types of sources, namely geometric and texture (of other information), within the Kalman filter framework (or other similar filters) to estimate the intensities of various AUs are implemented. Fusion of geometric and other (e.g., texture) information can be viewed as a sensor fusion problem.

The Kalman filter is a special form of dynamic Bayesian network that is applied to continuous state spaces with Gaussian transition and observation probability density functions. Kalman filtering involves two steps: predict and update. In the predict step, a dynamic process model is applied to the previous state to predict the current state. The predicted estimate is called the apriori state estimate. In the update step, one or more measurements are used to correct the apriori state to obtain the filtered or aposteriori state estimate. The noise in the measurements are assumed to follow the (multivariate) zero-mean normal distribution.

In the update step, the Kalman filter allows to fuse measurements from multiple sources, provided each source has a Gaussian noise model. The fusion is performed on the basis of the uncertainties in the measurements. To incorporate a measurement into the Kalman filter, two components are may be used:

a measurement model that maps the state variables to the measured variables:

a mean and covariance matrix describing the Gaussian noise in the measured variables.

The geometric measurement can comprise the positions of (e.g., 68) facial feature points (FFP). These are determined by a face alignment method. The measurement model for geometric measurement can be given by a 3D 68-point deformable shape model that is similar to the CANDIDE face model. The mean and covariance matrix for the geometric measurement can be determined empirically by applying the face alignment method to an annotated dataset, such as the Extended Cohn-Kanade dataset, and by aggregating the differences in the estimated positions of FFPs from the annotated positions.

The appearance-based measurements (texture information) or other measurements (e.g, measurements on speech or other data) comprise the probability outputs for different AU classes provided by SVMs trained on appearance-based features. The SVM probability outputs can be obtained using the method based on pairwise coupling. As a result, a continuous state space with Gaussian noise distribution, into which the SVM probability outputs have to be integrated as observations, is obtained.

For appearance-based measurements (texture information) or other measurements (e.g, measurements on speech or other data) for obtaining the other information, identity functions of corresponding AU parameters can be used as the measurement models. This directly maps the probability of an AU class to its intensity of expression. The probability of an AU class can be computed in different ways, depending on the output configuration of SVM.

Case A: A two-class SVM that detects the presence or absence of an AU A. This is the simplest case, where the probability output for class A provided by the SVM is used as-is.

Case B: A multiclass SVM that detects all possible Boolean combinations of occurrence of two or more AUs. Table 1 gives an example involving two AUs A and B. In such cases, the probability of each AU can be obtained through marginalisation. From the table below, the probability of A is computed as p+q, and that of B is computed as p+r.

| Boolean Combinations | Probability Notations |
|---|---|
| A and B | p |
| A and not B | q |
| not A and B | r |
| not A and not B | s | p, q, r and s add to 1 (exhaustive)

(Table listing the four boolean combinations of occurrence of two AUs: A, B, and notations for the probability outputs from a corresponding four-class SVM).

Case C: A multiclass SVM that detects several individual AUs. For example, a four-class SVM for A, B, C and rest. The probability of occurrence of A is the output of the SVM for AU class A. The probability of non-occurrence is the sum of the probabilities for the other three classes.

The probabilities computed in this fashion define a Bernoulli distribution for individual AUs. For an AU A, outcome 1 indicates occurrence of A and 0 indicates absence of A. If probability of occurrence of A is p, then first moment $\mu$, which is the expected value, is computed as $\mu=0(1-p)+1(p)=p$. Thus, the first moment is identical to the probability of occurrence of A. The second moment $\sigma^2$ is given by $$\sigma^2 = (0-p)(0-p)(1-p) + (1-p)(1-p)p = p(1-p).$$

For simplicity, the skewness of the distribution can be ignored and normality can be assumed. The skewness of the Bernoulli distribution can be computed as $$(1-2p)/\sqrt{p(1-p)}.$$

It has been noted that it is possible to assume normality when the skewness varies between −2 and 2. This corresponds approximately to the probability range [0.146; 0.854]. It has been noted that it is possible to assume normality throughout the probability range [0; 1]. Therefore, the second moment was used as the variance of the Gaussian noise associated with the appearance-based measurements. FIG. 8 illustrates how the variance varies according to the probability of occurrence.

4.17. Texture Information (or Other Information)

As discussed above, texture information (or other information) 230, 530 can be input to a corrector 250, 550, e.g. to perform the facial classification (e.g., 740).

FIG. 11 shows a system 1100 according to the invention. Block 1101 indicates a device and/or a method. Block 1101 can embody the device 200, the KF 501, the method of FIG. 1. Block 1101 has as an input both geometric measurements 1120 (which can embody inputs 220 and 520, for example) and texture information (or other information) 1130 (which can embody inputs 230 and 530, for example). The output 1142 (which can embody outputs 242 and 542) can be formed by AUs for a sequence of images (hereinafter, reference is made to "images"; however, other representations, such as 3D-point clouds, can be used instead of images).

The texture information (or other information) 1130 can refer to images $1160_{k-2}$, $1160_{k-1}$, $1160_k$, $1160_{k+1}$, etc. The images are acquired (e.g. by a videocamera) according to a time sequence 1161, e.g., at subsequent discrete time instants $t_{k-2}$, $t_{k-1}$, $t_k$, $t_{k+1}$, respectively. Each image can have a format which can bitmap, JPEG, GIF, and can have color or greyscales.

Texture information (or other information) 1130 can be obtained in form of probabilities, e.g., using an SVM block 1170.

This block can output probabilities for AUs. In particular, there is a probability $p^{(k)}$ for each image that can be used for values $I1^{(k)}$, $I2^{(k)}$, $I3^{(k)}$ in equation (36).

Further, block 1170 can output values for matrix R as discussed in section 4.15.

Input 1181 to block 1170 can be provided by block 1180, which can be based on an algorithm chosen, for example, among histograms of oriented gradients (HOG) [8], histograms of local Gabor binary patterns (LGBP) [9], and histograms of local binary patterns (LBP) [10].

According to HOG, for example, occurrences of gradient orientation in localized portions of an image are counted. They are computed on a dense grid of uniformly spaced cells and overlapping local contrast normalization for improved accuracy is used.

Each output 1181 provided by block 1180 can refer to each image (e.g., $1160_{k-2}$, $1160_{k-1}$, $1160_k$, $1160_{k+1}$,).

As can be understood, the present invention permits, inter alia, to obtain a final result valid for the whole sequence 1161 of images. Further, as described above, the other information, such as texture information, 1130 (or 230, 530, etc.) can be fused together with the geometric measurements to obtain an estimation of the AUs and their intensities (e.g., at output 1142).

4.18 Computer Implemented Invention

FIG. 10 shows an example of computer 1000 with a input/output means 1010 (which can embody means 210 and/or 510), processor 1020, and a storage means 1030. A program can be stored, that, when executed by the processor 1020, one of the inventive methods above can be performed. The embodiments of FIGS. 1, 2, 5, and 7, for example, can be controlled by processor 1020.

5. THE MASS-SPRING-DAMPER MODEL FOR ACTION UNIT DYNAMICS

A mass m attached to a spring can be intended to constitute a mass-spring system. When the system is stretched or compressed along the axis of the spring, a force is generated that attempts to restore the system to its resting (or equilibrium) position. This force is called restoration force. According to Hooke's law, the restoration force is proportional to the displacement of the mass-spring system from the resting position, when the displacement is within the proportionality limit of the spring. The restoration force is directed towards the resting position. That is to say, it acts opposite to the direction of displacement.

$F_r = -kx$, where $F_r$ is the restoration force, x is the displacement from the equilibrium position and k is the stiffness of the spring. For simplicity, in this work, k is assumed to be a single real-valued scalar. Since k is constant within the proportionality limit, it is also known as the spring constant.

In reality, the restoration force is not the only force that acts on a mass-spring system and characterises its motion. Hereinafter, the motion of the mass-spring system is discussed under the influence of a damping force (for example, friction) and an external driving force.

5.1 Ideal Mass-Spring System

An ideal mass-spring system does not experience any damping force, such as friction, during its motion. The mass is considered to be rigid and the spring is considered to be massless. The only force that acts on the system is the restoration force $F_r$. Therefore, $F_{net} = m\ddot{x} = F_r = -kx$. The solution to this equation gives displacement as a sinusoidal function of time with constant amplitude. The motion of an ideal mass-spring system is an example of simple harmonic oscillation. Once set in motion, and left to its own, an ideal mass-spring system will never stop oscillating. The frequency of oscillation is given by $\sqrt{(k/m)}$. It is also known as the natural frequency, $\omega_0$ of the ideal mass-spring system. The motion is along the axis of the spring. The acceleration due to the restoration force is directed towards the equilibrium position. On the other hand, displacement is directed away from the equilibrium position. Velocity has a phase-shift of 90° relative to the displacement.

5.2 Mass-Spring-Damper System

In reality, mass-spring systems experience damping. The effect of damping is modelled as proportional to the magnitude of the velocity, but acting in the opposite direction. $F_d=-c\dot{x}$, where $F_d$ is the damping force, $\dot{x}$ is the velocity and c is the "viscous damping coefficient". The damping ratio $\zeta$ is defined in terms of c, k and m as $c/2\sqrt{km}$. $\zeta$ describes the nature of the damped motion of the system. The damped motion is along the axis of the spring.

$\zeta<1$ Underdamped $\zeta=1$ Critically damped $\zeta>1$ Overdamped

The motion of a mass-spring-damper system that is not acted upon by any external driving force is described by the net force $F_{net}=F_r+F_d$. The standard form in terms of x, $\dot{x}$ and $\ddot{x}$ is derived below:

$$F_{net} = F_r + F_d \qquad (101)$$

i.e. $m\ddot{x} = -kx - c\dot{x}$ (Dividing by m) $\ddot{x} = -\frac{k}{m}x - \frac{c}{m}\dot{x}$ (Rewriting c in terms of $\zeta$) $\ddot{x} = -\frac{k}{m}x - \frac{2\zeta\sqrt{km}}{m}\dot{x}$ $\left(\text{Using } \omega_0 = \sqrt{\frac{k}{m}}\right) \ddot{x} = -\omega_0^2 x - 2\zeta\omega_0 \dot{x}$

5.3 Driven Mass-Spring-Damper System

An external force, $F_e$ may be applied to drive a mass-spring-damper system. For simplicity, in this work, $F_e$ is assumed to be acting along the axis of the spring. The net force $F_{net}$ would now be $F_r+F_d+F_e$.

$$F_{net} = F_r + F_d + F_e \qquad (102)$$

i.e. $m\ddot{x} = -kx - c\dot{x} + F_e$ (Dividing by m) $\ddot{x} = -\frac{k}{m}x - \frac{c}{m}\dot{x} + \frac{F_e}{m}$ (Rewriting in terms of $\omega_0$ and $\zeta$)

$\ddot{x} = -\omega_0^2 x - 2\zeta\omega_0 \dot{x} + \frac{F_e}{m}$

The closed form solution for the displacement x depends on the form of $F_e$. Solutions for impulse, step and sinusoidal driving forces are briefly discussed in.

Equation 102 is a second-order differential equation. To obtain the state space representation, it should be rewritten in the form of two first-order differential equations. The state space representation of the driven mass-spring-damper system can be derives as follows [6]:

Let $u = x$ and $v = \dot{x}$ $\qquad (103)$ $\dot{u} = \dot{x} = v$ and $\dot{v} = \ddot{x}$ $\begin{bmatrix} \dot{u} \\ \dot{v} \end{bmatrix} = \begin{bmatrix} v \\ \ddot{x} \end{bmatrix}$ $= \begin{bmatrix} v \\ -\omega_0^2 u - 2\zeta\omega_0 v + \frac{F_e}{m} \end{bmatrix}$ $\begin{bmatrix} \dot{u} \\ \dot{v} \end{bmatrix} = \begin{bmatrix} 0 & 1 \\ -\omega_0^2 & -2\zeta\omega_0 \end{bmatrix} \begin{bmatrix} u \\ v \end{bmatrix} + \begin{bmatrix} 0 \\ \frac{1}{m} \end{bmatrix} F_e$ $\frac{1}{m}F_e$ is the acceleration due to $F_e$, and will be denoted as $a_e$. $a_e$ acts in the same direction as $F_e$.

5.4 Runge-Kutta Methods

Runge-Kutta (RK) methods are used to compute approximate solutions of differential equations. Given an initial value problem, an RK method is applied iteratively to obtain the solution at the desired time t. The interval between initial time $t_0$ and t is divided into a number of smaller intervals, each of size h. In each iteration, the RK method computes the approximate solution for the next time step $t_{n+1}=t_n+h$, starting with $t_n=t_0$. The $4^{th}$ order RK method (abbreviated as RK4) is commonly used, and is described in the paragraphs below.

Given a first-order ordinary differential equation $\dot{y}=f(t, y)$ and the initial condition $y(t_0)=y_0$, where y is the dependent variable and t is the independent variable, RK4 can be used to approximate the numerical value of y(t) at any time t=t'. The interval $\Delta t=(t'-t_0)$ is divided into N subintervals, each of duration $$h = \frac{\Delta t}{N}.$$

h is called the step-size. The first iteration of RK4 computes the approximate value of y(t) at $t=t_0+h$. The second iteration computes the approximate value at $t=t_0+2h$, and so on. Finally, the $N^{th}$ iteration computes the approximate value of y(t) at $t=t_0+Nh=t'$. At each iteration, RK4 uses the value computed at the previous iteration to compute four increments, namely, $k_1$, $k_2$, $k_3$ and $k_4$. In the first iteration, the initial condition is used. The update for y(t) for the current time step is then computed as a weighted average of the four increments scaled by the step size h. The equations involved in the $n^{th}$ iteration, where $n \in \{1, 2, \ldots, N\}$, are given below:

$$t_{n-1} = t_0 + (n-1)h \qquad (104)$$

$t_n = t_0 + nh == t_{n-1} + h$ $y_{n-1} = y(t_{n-1})$ $y_n = y(t_n)$ $k_1 = f(t_{n-1}, y_{n-1})$ $k_2 = f\left(t_{n-1} + \frac{h}{2}, y_{n-1} + \frac{h}{2}k_1\right)$ $$k_3 = f\left(t_{n-1} + \frac{h}{2}, y_{n-1} + \frac{h}{2}k_2\right)$$

$$k_4 = f(t_{n-1} + h, y_{n-1} + hk_3)$$

$$\bar{k}_w = \frac{1}{6}(k_1 + 2k_2 + 2k_3 + k_4)$$

$$y_n = y_{n-1} + h\bar{k}_w$$

The truncation error at each iteration is of the order of $O(h^5)$. The truncation error accumulated over N iterations is of the order of $O(h^4)$.

RK4 can be applied to a system of first-order ordinary differential equations, such as that given in Equation 103. Let us consider a system of two first-order ordinary differential equations with an initial condition as given below:

$$\begin{bmatrix} \dot{y} \\ \dot{z} \end{bmatrix} = \begin{bmatrix} f(t, y, z) \\ g(t, y, z) \end{bmatrix}, \begin{bmatrix} y(t_0) \\ z(t_0) \end{bmatrix} = \begin{bmatrix} y_0 \\ z_0 \end{bmatrix} \quad (105)$$

In Equation 105, t is the independent variable. The computations in the $n^{th}$ iteration of RK4 for the above system are as illustrated below:

$$\begin{bmatrix} k_{1,y} \\ k_{1,z} \end{bmatrix} = \begin{bmatrix} f(t_{n-1}, y_{n-1}, z_{n-1}) \\ g(t_{n-1}, y_{n-1}, z_{n-1}) \end{bmatrix} \quad (106)$$

$$\begin{bmatrix} k_{2,y} \\ k_{2,z} \end{bmatrix} = \begin{bmatrix} f\left(t_{n-1} + \frac{h}{2}, y_{n-1} + \frac{h}{2}k_{1,y}, z_{n-1} + \frac{h}{2}k_{1,z}\right) \\ g\left(t_{n-1} + \frac{h}{2}, y_{n-1} + \frac{h}{2}k_{1,y}, z_{n-1} + \frac{h}{2}k_{1,z}\right) \end{bmatrix}$$

$$\begin{bmatrix} k_{3,y} \\ k_{3,z} \end{bmatrix} = \begin{bmatrix} f\left(t_{n-1} + \frac{h}{2}, y_{n-1} + \frac{h}{2}k_{2,y}, z_{n-1} + \frac{h}{2}k_{2,z}\right) \\ g\left(t_{n-1} + \frac{h}{2}, y_{n-1} + \frac{h}{2}k_{2,y}, z_{n-1} + \frac{h}{2}k_{2,z}\right) \end{bmatrix}$$

$$\begin{bmatrix} k_{4,y} \\ k_{4,z} \end{bmatrix} = \begin{bmatrix} f(t_{n-1} + h, y_{n-1} + hk_{3,y}, z_{n-1} + hk_{3,z}) \\ g(t_{n-1} + h, y_{n-1} + hk_{3,y}, z_{n-1} + hk_{3,z}) \end{bmatrix}$$

$$\begin{bmatrix} \bar{k}_{w,y} \\ \bar{k}_{w,z} \end{bmatrix} = \frac{1}{6} \begin{bmatrix} k_{1,y} + 2k_{2,y} + 2k_{3,y} + k_{4,y} \\ k_{1,z} + 2k_{2,z} + 2k_{3,z} + k_{4,z} \end{bmatrix}$$

$$\begin{bmatrix} y_n \\ z_n \end{bmatrix} = \begin{bmatrix} y_{n-1} \\ z_{n-1} \end{bmatrix} + h \begin{bmatrix} \bar{k}_{w,y} \\ \bar{k}_{w,z} \end{bmatrix}$$

5.4 Continuous-Discrete Extended Kalman Filter

The state space representation of a continuous-time random process may be written as follows:

$$\dot{x} = f(x) + w \quad (107)$$

In Equation 107, f is a vector of $N_x$ linear or nonlinear functions of the time variable t and the $N_x$ random variables that constitute the state vector x (Not all of these variables may be involved in all the functions in f). $\dot{x}$ denotes the vector of the time-derivatives of the random variables in x. f defines the mapping from x to $\dot{x}$. w is the vector of $N_x$ white noise components that affect the time-derivatives of state variables and is assumed to follow the Gaussian $\mathcal{N}(0, Q)$. For simplicity, w can be rewritten in the form of a square matrix G of order $N_x$ times a vector of $N_x$ independent unity white noise signals $w_u$ (w may also be expressed in more complex/generic forms). The covariance matrix Q' for $w_u$ is the identity matrix. If the white noise in the time-derivative of each state variable is assumed to be independent of the noise in other state variables, then G is a diagonal matrix. If the noise in the time-derivative of the state variables are correlated to each other then G is a lower or upper triangular matrix (other strategies can be used; however, Q represents the covariances between the time-derivatives of state variables). The covariance matrix Q for w is then computed as $GQ'G^T = GG^T$.

The continuous-discrete extended Kalman filter (hybrid extended Kalman filter), is used when the process model is continuous in time whereas the measurements are available only at discrete points in time. The functioning of the hybrid (extended) Kalman filter is similar to that of the continuous (extended) Kalman filter. The only difference is that the update step can be performed only at discrete instants of time, when the measurements are available. The $k^{th}$ predict step of the hybrid extended Kalman filter should therefore, aggregate the effects of the process model during the time interval $(t_{k-1}, t_k]$. In other words, it should compute the value of x(t) at $t = t_k$, given the initial conditions at $t_0 = t_{k-1}$. The initial conditions are aposteriori state estimates computed at the previous time step, i.e. at $t = t_{k-1}$.

The equations in the predict step of the continuous Kalman filter define the instantaneous rate of change of the optimal state estimate $\hat{x}$ and the associated estimation error covariance matrix P. The equations contain terms involving the measurement noise covariance matrix R and the Kalman gain matrix K. In the case of hybrid Kalman filter, the measurements are available only at discrete points in time. Therefore, these terms are ignored. Consequently, the instantaneous rate of change equations used in the hybrid extended Kalman filter, for the process defined in Equation 107, are as follows:

$$\dot{\hat{x}} = f(\hat{x}) \quad (108)$$

$$\dot{P} = FP + PF^T + Q \quad (109)$$

In Equation 108, $\hat{x}$ represents estimates of the state x generated by the Kalman filter at any time t. $\dot{\hat{x}}$ represents the instantaneous time-rate of change of the estimate of the state, and is determined by the function vector f. As noted earlier, the components of f may additionally be dependent on the time variable t. In Equation 109, $\dot{P}$ is the instantaneous time-rate of change of the estimation error covariance matrix P. F is the Jacobian of f w.r.t x. Like f, F may also be dependent on the time variable t. As noted earlier, Q is the covariance matrix of the Gaussian white noise in the time-derivatives of the state variables.

Conceptually, the $k^{th}$ predict step of the hybrid extended Kalman filter computes the apriori estimates for the state x and estimation error covariance matrix P by (i) solving the Equations 108 and 109 subject to the initial conditions given by the aposteriori estimates at time step k−1, and then (ii) by evaluating the solutions at time $t = t_k$. In some cases, closed form solutions to Equations 108 and 109 may be difficult to determine. Even if they can be determined analytically, they may be complex and involve many nonlinear terms in the time variable t, evaluation of which would be computationally expensive. In these cases, numerical methods such as the RK4 method can be used instead of analytical methods.

5.5 Modelling of AU Dynamics

The driven mass-spring-damper system described in Section 5.3 was adopted to model the dynamics of motion of facial muscles corresponding to each AU. The AU-related deformation vectors in the AUSU model may represent linear directions of deformation in a 204-dimensional space of facial shape (other dimensions are notwithstanding possible). The AU parameters may indicate the amount of displacement along these vectors. The facial muscle or facial muscle group corresponding to each AU can be modelled as a mass-spring-damper system, with its axis along the corresponding deformation vector. The AU parameters can be interpreted as the displacement of the spring from the resting position. When all muscles are at rest, the neutral face is obtained. This corresponds to the configuration where all AU parameters are zero.

Each AU correspond to the movement caused by the contraction of a single facial muscle or a group of facial muscles. The tension applied to the muscle(s) can be considered as the external driving force acting on the corresponding mass-spring-damper systems. The muscle or muscles involved in the movement may be either elongated or shortened. However, the AU parameters in the AUSU model are constrained to the range [0,1]. Therefore, in a physical model of motion of facial muscles, it is assumed that the mass-spring-damper systems are attached in such a way that each AU causes the spring to elongate along its axis. The directions of elongation are therefore identical to the directions of the deformation vectors.

Tension is applied to the facial muscles to produce facial movements. When the tension is released, the muscles settle to their original lengths. Since all springs are assumed to be elongated, the tension or the driving force should be assumed to be unidirectional, and acting in the direction of the deformation vector. Since displacement is possible only in one direction, an underdamped configuration can be ruled out. Instead, a critically damped or overdamped mass-spring-damper system would be suitable. In this work, an overdamped model was used.

Since the directions of all linear vector quantities involved, namely displacement u, velocity v, acceleration $\dot{v}$, driving force $F_e$ and acceleration due to driving force $a_e$ are represented by a corresponding 204-D deformation vector, those quantities can be considered as 1D vectors and represented equivalently by scalars-u, v, $\dot{v}$, $F_e$ and $a_e$, respectively.

5.5 Modelling of Uncertainties

The driven mass-spring-damper system described above is merely an approximation of the AU dynamics. The errors in the model are modelled as a zero-mean Gaussian-distributed white noise affecting the acceleration. It is also in general not easy to estimate the parameters involved in the dynamic model, namely, natural frequencies and damping ratios for all mass-spring-damper systems. In addition, the form of the driving force $F_e$ is unknown. To deal with these uncertainties, the state vector can be augmented with the natural frequencies, damping ratios and acceleration due to the driving forces for all driven mass-spring-damper systems. For simplicity, these are assumed to be constant during the time interval between successive measurements. The errors in these quantities are modelled as a zero-mean Gaussian-distributed white noise. These errors are considered uncorrelated to the white noise that directly affects the acceleration. The effect of errors in these quantities are eventually propagated into acceleration, velocity and displacement through the equations that define the motion of the driven mass-spring-damper systems. This is taken care of by the predict step of the extended Kalman Filter.

5.6 Continuous-Time State Space Representation

The driven mass-spring-damper motion model and the uncertainties together model the facial motion associated with each AU as a continuous-time random process. For simplicity, the AUs are assumed to be uncorrelated to each other. In addition, the noise in each AU is modelled identically. The state space representation of the process model for each AU A is given below.

$$\begin{bmatrix} \dot{u}_A \\ \dot{v}_A \\ \dot{\omega}_{0,A} \\ \dot{\zeta}_A \\ \dot{a}_{e,A} \end{bmatrix} = \begin{bmatrix} v_A \\ -\omega_{0,A}^2 u_A - 2\zeta_A \omega_{0,A} v_A + a_{e,A} \\ 0 \\ 0 \\ 0 \end{bmatrix} + \quad (110)$$

$$\begin{bmatrix} 0 & 0 & 0 & 0 & 0 \\ 0 & \sigma_{\dot{v}} & 0 & 0 & 0 \\ 0 & 0 & \sigma_{\dot{\omega}_0} & 0 & 0 \\ 0 & 0 & 0 & \sigma_{\dot{\zeta}} & 0 \\ 0 & 0 & 0 & 0 & \sigma_{\dot{a}_e} \end{bmatrix} \begin{bmatrix} w_{u,1} \\ w_{u,2} \\ w_{u,3} \\ w_{u,4} \\ w_{u,5} \end{bmatrix}$$

In Equation 110, $u_A$ is the displacement of the spring, which is the value of the AU parameter corresponding to A (see above). $\forall i \in \{1, 2, \ldots, 5\}$, $w_{u,i}$ is the unity white noise signal (mean: zero, variance: unity). $w_{u,i}$ is assumed to be uncorrelated to $w_{u,j}$, $\forall i,j \in \{1, 2, \ldots, 5\}$ and $i \neq j$. The independent variable is the time t. $\sigma$ values are the standard deviations of the corresponding Gaussian white noise distributions.

Equation 110 can be rewritten as follows:

$$\begin{bmatrix} \dot{u}_A \\ \dot{v}_A \\ \dot{\omega}_{0,A} \\ \dot{\zeta}_A \\ \dot{a}_{e,A} \end{bmatrix} = \begin{bmatrix} v_A \\ -\omega_{0,A}^2 u_A - 2\zeta_A \omega_{0,A} v_A + a_{e,A} \\ 0 \\ 0 \\ 0 \end{bmatrix} + G_{au}^b \begin{bmatrix} w_{u,1} \\ w_{u,2} \\ w_{u,3} \\ w_{u,4} \\ w_{u,5} \end{bmatrix} \quad (111)$$

In Equation 111, the superscript $^b$ in $G_{au}^b$ denotes that the matrix is a basic unit for forming the AU parameters-related process noise covariance matrix $Q_{au}$. Following the discussion in Section 3, for each AU A, the process noise covariance relative to itself, that is $Q_A$, can be computed as $G_{au}^b G_{au}^{b^T}$. $Q_{au}$ is a 5×5 block diagonal matrix with each block equal to $Q_A$. Since $G_{au}^b$ is a diagonal matrix, $Q_A$ is nothing but the matrix formed by squaring the diagonal elements of $G_{au}^b$.

5.9 Modelling for Nonlinear Systems

Face and head motion are continuous in time. for constant position and constant velocity motion models (see above), equations that give position and velocity are not difficult to be obtained (see above). However, for non-linear systems, closed-form analytical solutions are not easy to obtain. Therefore, it is useful to represent them as ordinary differential equations, which can be numerically integrated to obtain the values at different points in time.

In one example, the constant velocity model can be used for head pose parameters (e.g., angles of rotations), constant position model can be used for SU parameters (shapes that do not change over time), and mass spring damper model for AU parameters.

It is therefore possible to reformulate the process model for the Kalman filter in the form of ordinary differential equations. the version of the Kalman filter that deals with such equations is the Continuous Time Kalman Filter.

The process model used in a Continuous Time Kalman Filter is the following:

$$\dot{x} = f(x) + w$$

where x represents the instantaneous time-rate of change of state x (e.g., dx/dt), and w is the noise in this process model.

Since the measurements are only in discrete time steps (frames of a video), the update step can be performed at discrete times. To get the apriori state estimate, the equation above is integrated. In particular, the a priori state and the associated error covariance matrixes are obtained by integrated the following equations:

$$\dot{x} = f(x) + w$$

$$\dot{P} = FP + PF^T + Q$$

Here, F is the Jacobian matrix of function f.

Due to nonlinear relationships, function f is here not written in matrix form. Function f is here described as a vector of functions:

$$f(x) = \begin{bmatrix} f^1_{cvel}(x) \\ f^2_{cvel}(x) \\ \ldots \\ f^6_{cvel}(x) \\ f^1_{MSD}(x) \\ f^2_{MSD}(x) \\ \ldots \\ f^{22}_{MSD}(x) \\ f^1_{cpos}(x) \\ \ldots \\ f^{61}_{cpos}(x) \end{bmatrix}$$

$$f^1_{cvel}(x) = \begin{bmatrix} 0 & 1 \\ 0 & 0 \end{bmatrix} \begin{bmatrix} x_1 \\ \dot{x}_1 \end{bmatrix}$$

Here, $x_1$ can be intended as a rotation value (e.g., a $\Theta_x$ rotation value about a x axis). The 2*2 matrix is multiplied to the vector with x its temporal derivative.

$$f^1_{cpos}(x) = 0[x_1].$$

$f^1_{cpos}(x)$ is the first SU parameter and is constantly zero as the position does not change.

$f^1_{MSD}(x)$ can be construed as the first addend of the second term of equation 111, with A chosen between 1 ... 22.

The form of matrix Q is similar, except that now it contains instantaneous values for noise covariances.

5.8 AU Correlation Coefficients

Since the time interval between successive frames (assuming that a measurement is available for every frame) can be of the order of $10^{-2}$, the number of iterations in RK4 method can be set to 1. Empirical evaluations did not show significant performance differences between 30 RK4 iterations and one RK4 iteration.

| Process Noise in | Notation | Value |
| --- | --- | --- |
| $\dot{u}_A$ | $\sigma_{\dot{u}}^2$ | 0 |
| $\dot{v}_A$ | $\sigma_{\dot{v}}^2$ | 0.03 |
| $\dot{\omega}_{0,A}$ | $\sigma_{\dot{\omega}_0}^2$ | 0.0001 |
| $\dot{\zeta}_A$ | $\sigma_{\dot{\zeta}}^2$ | 0.0001 |
| $\ddot{a}_{e,A}$ | $\sigma_{\ddot{a}_e}^2$ | 100 |

(Variances of noises affecting the time-derivative of system state variables, for each AU A. Identical values are used for all AUs)

| Process Noise in | Notation | Value |
| --- | --- | --- |
| $\dot{\theta}_X, \dot{\theta}_Y, \dot{\theta}_Z$ | $\sigma_{\dot{\theta}}^2$ | 0 |
| $\ddot{\theta}_X, \ddot{\theta}_Y, \ddot{\theta}_Z$ | $\sigma_{\ddot{\theta}}^2$ | 0.01 |
| $\dot{\Delta}_X, \dot{\Delta}_Y, \dot{\Delta}_Z$ | $\sigma_{\dot{\Delta}}^2$ | 0 |
| $\ddot{\Delta}_X, \ddot{\Delta}_Y, \ddot{\Delta}_Z$ | $\sigma_{\ddot{\Delta}}^2$ | 0.0001 |
| $\dot{S}_S$ | $\sigma_{\dot{S}}^2$ | $2 \times 10^{-14}$ |

(Variances of noises affecting the time-derivative of system state variables, for each rotation angle, translation component and SU S. Identical values are used for similar variables)

A PDM with 60 eigenvectors representing shape deformations can be used.

The AU deformation vectors in the AUSU model can be not orthogonal. Therefore, the assumption of independence between the AU parameters that is used in the design of covariance matrices for AU parameter-related process noise $Q_{au}$, constraint noise $R_{au}$ and initial state estimation error $P_{0,au}$, does not necessarily hold in reality. However, due to lack of ground truth on the values of AU parameters, it is not possible to empirically determine the correlation coefficients for noise related to the AU parameters. To overcome this, we computed the correlation coefficients between the different AU deformation vectors. Each vertex coordinate in the deformation vector was treated as a sample data point for that AU. The coordinates in each deformation vector were averaged and the average was subtracted from that deformation vector. The mean-normalised vectors when then converted into unit vectors by diving with the respective 2-norms. The dot product of such mean-normalised unit vectors were computed (this is same as the cosine of the angle between the mean-normalised vectors). These dot products lie in the range [−1,1] and are used as the correlation coefficients.

The use of AU correlation coefficients are enabled and disabled using a boolean configuration flag config.kalman.useaucorrelationcoefficients. This flag is defined in config.lua file and has the default value as true. This flag can be configured at runtime through the command-line argument no. 8. If enabled, these coefficients are used in $Q_{au}$, $R_{au}$ and $P_{0,au}$. The basic covariance matrix $(G_{au}^b G_{au}^{b^T})$ is scaled by the corresponding correlation coefficients to obtain the AU-level covariances. These are later used in $Q_{au}$. The matrices $R_{au}$ and $P_{0,au}$ are similarly updated by scaling the corresponding basic covariance matrices.

In FIG. 9, an ellipse is shown for each pair of non-identical AUs. For each pair of non-identical AUs, a 2×2 covariance matrix can be formed with the variances set to 1 and the covariance consequently equal to the correlation coefficient. Eigen values and eigen vectors of the 2×2 covariance matrix can be computed. The eigenvector corresponding to the largest eigenvalue is the major axis of the 1−σ confidence ellipse. The other eigenvector is the minor axis. Square root of the eigenvalues gives the length of the corresponding semi-axes. In the Figure, the ellipses are positioned at the point representing the corresponding pair of AUs. For each individual ellipse, the directions of the right-hand Cartesian coordinate system apply, and its center is the origin of the corresponding local X-Y coordinate system that is represented by the enveloping grey squares. The ellipses shown in the Figure are uniformly downscaled versions of the 1-σ ellipses. The downscaling was performed for improving the visual discriminability of the ellipses.

The correlation coefficient for each AU with respect to itself is unity. Therefore, all elements in the corresponding covariance matrix are ones, and the eigen values of the covariance matrix are 0 and 2. The major axis is given by the vector $[1\ 1]^T$. Since the minor axis has length zero, the ellipse collapses to a straight line segment inclined at 45° above the horizontal. These are indicated in the FIG. 2 by the black line segments along the antidiagonal. These black line segments are also scaled down versions of the original. The downscaling was done for the same reason as mentioned above.

In FIG. 9, the longer the major axis is relative to the minor axis, the greater is the magnitude (strength) of the correlation. In other words, the closer the major and minor axes are in their length, the weaker is the magnitude (strength) of the correlation. If the axes are of the same length, then the corresponding AUs are uncorrelated (the ellipse would now be transformed into a circle). If the major axis is inclined at 45° above the horizontal, the correlation is positive. If the major axis is inclined at 45° below the horizontal, then the correlation is negative. Positive correlation is indicated in the Figure with arrows directed towards up/right and negative correlation is indicated with arrows directed towards bottom/right.

6. FURTHER INVENTIVE IMPLEMENTATIONS

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, one or more of the most important method steps may be executed by such an apparatus.

Depending on certain implementation requirements, examples can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of method is, therefore, a computer program having a program code for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are typically tangible and/or nontransitionary.

A further example of the method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

7. LIST OF TERMS

Action Unit: A basic observable unit of facial expression.

AU Model: A linear, parametric representation of deformable facial shape, which incorporates semantic information about facial actions.

AUSU Model: An extension of the AU model to include person-dependent modes of shape variation.

Constrained Local Model: A method for fitting parameterised deformable shape models based on local features.

Extended Kalman Filter: A variant of Kalman filter for nonlinear systems.

Point Distribution Model: A linear, parameterised way of representing deformable shapes defined by a set of landmarks.

8. REFERENCES

[1] Paul Ekman and Wallace V. Friesen, Facial action coding system: A technique for the measurement of facial movement, Consulting Psychologists Press, Palo Alto, Calif., 1978.

[2] Christian Kublbeck and Andreas Ernst, 'Face detection and tracking in video sequences using the modified census transformation', Image Vision Comput., 24(6), 564-572, (June 2006).

[3] I. Kotsia, S. Zafeiriou, N. Nikolaidis, and I. Pitas, 'Texture and shape information fusion for facial action unit recognition', in Advances in Computer-Human Interaction, 2008 First International Conference on, pp. 77-82, (February 2008).

[4] I. Kotsia, N. Nikolaidis, and I. Pitas, 'Fusion of geometrical and texture information for facial expression recognition', in Image Processing, 2006 IEEE International Conference on, pp. 2649-2652, (October 2006).

[5] Zuheng Ming, A. Bugeau, J. L. Rouas, and T. Shochi, 'Facial action units intensity estimation by the fusion of features with multi-kernel support vector machine', in Automatic Face and Gesture Recognition (FG), 2015 11th IEEE International Conference and Workshops on, volume 06, pp. 1-6, (May 2015).

[6] T. Senechal, V. Rapp, H. Salam, R. Seguier, K. Bailly, and L. Prevost, 'Facial action recognition combining heterogeneous features via multikernel learning', IEEE Transactions on Systems, Man, and Cybernetics, Part B (Cybernetics), 42(4), 993-1005, (August 2012).

[7] N. Dalal and B. Triggs, 'Histograms of oriented gradients for human detection', in Computer Vision and Pattern Recognition, 2005. CVPR 2005. IEEE Computer Society Conference on, volume 1, pp. 886-893 vol. 1, (June 2005).

[9] T. R. Almaev and M. F. Valstar, 'Local gabor binary patterns from three orthogonal planes for automatic facial expression recognition', in Affective Computing and Intelligent Interaction (ACII), 2013 Humaine Association Conference on, pp. 356-361, (September 2013).

[10] D. Huang, C. Shan, M. Ardabilian, Y. Wang, and L. Chen, 'Local binary patterns and its application to facial image analysis: A survey', IEEE Transactions on Systems, Man, and Cybernetics, Part C (Applications and Reviews), 41(6), 765-781, (November 2011).

The invention claimed is:

1. A device for determining action units (AU) associated to a face, comprising:
an input which receives input data associated to a sequence of images or other representations of a face acquired at subsequent time instants, the input data comprising:
geometric measurements of the face; and
other information including texture information of the face, the texture information including probabilities of AU classes as provided by support vector machines (SVMs);
a predictor which, for each image or other representation in the sequence, predicts probabilities of AU classes associated to facial parameters based on a model describing properties of facial shape and deformation characteristics; and
a corrector which, for each image or other representation of the sequence, corrects the predicted probabilities on the basis of the input data and feeds back the corrected predicted probabilities to the predictor;
a block extracting AU intensities from the corrected probabilities; and
a block determining the AU on the basis of the extracted AU intensities by classifying and/or detecting facial expressions or the probability or intensity thereof, according to AU classes.

2. The device of claim 1, wherein other representations are chosen between 2D representations and 3D representations, such as 3D-point clouds, or combinations of 2D representations and 3D representations.

3. The device of claim 1, wherein the other information further comprises visual or non-visual data, such as gesture data, posture data, physiological data, and audio data.

4. The device of claim 1, modifying facial parameters acquired in correspondence of previous images or other representations on the basis of a function, or a Jacobian expression thereof, that is based on the dynamics of the facial movements.

5. The device of claim 1, using covariances of disturbance, or the cumulative effect thereof, during the interval from two consecutive images or other representation, to calculate covariances of errors of predicted facial parameters, and/or covariances of errors in acquiring measurements to update covariances of errors of predicted facial parameters.

6. The device of claim 1, using covariances of probabilistic values associated to texture information.

7. The device of claim 1, mapping the probability of at least one AU into an intensity of expression.

8. The device of claim 1, comprising at least:
a two-class SVM technique that detects the presence or absence of an AU.

9. The device of claim 1, using parametric state estimation.

10. The device of claim 1, using online calibration.

11. A method for determining action unit (AU) associated to a face, the method comprising, from a sequence of data associated to a sequence of images or other representations of a face acquired at subsequent time instants,
performing, for each of the images or other representations, the following feedback-based procedure:
predicting probabilities of AU classes associated to facial parameters based on a model describing properties of facial shape and deformation characteristics; and
correcting the predicted probabilities on the basis of the input data and feeding back the corrected probabilities to a predicting step applied to the subsequent image or other representation, the input data comprising:

geometric measurements of the face; and other information including texture information of the face, the texture information including probabilities of AU classes as provided by support vector machines (SVMs); and extracting AU intensities from the corrected probabilities;

determining the AU on the basis of the extracted AU intensities by classifying and/or detecting facial expressions or the probability or intensity thereof, according to AU classes.

12. The method of claim 1, using a constant velocity model for head pose parameters, constant position model for shape unit, SU, parameters, and mass spring damper model for AU parameters.

13. The method of claim 11, further comprising predicting at instant k a face model expressed as $Z^{(k)}$ comprising measurements at instant k and probability values as texture information.

14. The method of claim 11, further comprising using trained classifiers providing a probability value indicating the probability that particular sections of the images or other representations depict a particular facial expression.

15. The method of claim 11, further comprising acquiring the variance of the Bernoulli distribution defined by machine learning technique outputs.

16. A non-transitory digital storage medium having a computer program stored thereon to perform the following method, from a sequence of images or other representations representing a face, performing, for each of the images or other representations:

predicting probabilities of action unit (AU) classes associated to facial parameters based on a model describing properties of facial shape and deformation characteristics; and correcting the predicted probabilities on the basis of the input data, the input data comprising:

geometric measurements; and other information including texture information of the face, the texture information including probabilities of AU classes as provided by support vector machines (SVMs);

extracting AU intensities from the corrected probabilities; and determining the AU on the basis of the extracted AU intensities, by classifying and/or detecting facial expressions or the probability or intensity thereof, according to AU classes, when said computer program is run by a computer.

17. The device of claim 1, further comprising:

a multiclass SVM technique that detects Boolean combinations of occurrence of two or more AUs.

18. The device of claim 1, further comprising:

a multiclass SVM technique that detects individual AUs.

19. The method of claim 11, further comprising discriminating between posed and spontaneous expressions on the basis of the extracted AU intensities.

* * * * *